(12) United States Patent
Walsh et al.

(10) Patent No.: US 12,007,107 B2
(45) Date of Patent: Jun. 11, 2024

(54) LED GROWTH LIGHT

(71) Applicant: ABUNDANT LIGHTING TECHNOLOGY, LLC, Grand Rapids, MI (US)

(72) Inventors: John M. Walsh, Grand Rapids, MI (US); Joel T. Pyper, Holland, MI (US); Nathan A. Fortier, Grandville, MI (US); Toby J. Leifker, Mason, MI (US)

(73) Assignee: ABUNDANT LIGHTING TECHNOLOGY, LLC, Grand Rapids, MI (US)

( * ) Notice: Subject to any disclaimer, the term of this patent is extended or adjusted under 35 U.S.C. 154(b) by 27 days.

(21) Appl. No.: 17/854,013

(22) Filed: Jun. 30, 2022

(65) Prior Publication Data
US 2022/0341581 A1 Oct. 27, 2022

Related U.S. Application Data

(63) Continuation of application No. 16/893,727, filed on Jun. 5, 2020, now Pat. No. 11,402,089.
(Continued)

(51) Int. Cl.
*F21V 29/00* (2015.01)
*A01G 7/04* (2006.01)
*F21V 17/10* (2006.01)
*F21V 19/00* (2006.01)
*F21V 23/04* (2006.01)
(Continued)

(52) U.S. Cl.
CPC ............ *F21V 29/677* (2015.01); *A01G 7/045* (2013.01); *F21V 17/104* (2013.01); *F21V 19/0045* (2013.01); *F21V 23/0435* (2013.01); *F21V 29/75* (2015.01); *F21V 29/89* (2015.01); *F21V 23/06* (2013.01); *F21Y 2105/16* (2016.08); *F21Y 2113/17* (2016.08); *F21Y 2115/10* (2016.08)

(58) Field of Classification Search
CPC ........ F21V 29/677; F21V 29/75; F21V 29/89; F21V 17/104; F21V 19/0045; F21V 23/0435; A01G 7/045; F21Y 2105/16; F21Y 2113/17; F21Y 2115/10
See application file for complete search history.

(56) References Cited

U.S. PATENT DOCUMENTS

| 5,012,395 A | 4/1991 | Wettengel |
| 5,012,609 A | 5/1991 | Ignatius et al. |

(Continued)

FOREIGN PATENT DOCUMENTS

GB    2548695    9/2017

*Primary Examiner* — Gerald J Sufleta, II
(74) *Attorney, Agent, or Firm* — PRICE HENEVELD LLP

(57) ABSTRACT

An LED growth light and method for providing light to plants incorporating an LED arrangement, a growth light housing, and a power source. The LED arrangement includes LEDs arranged in individually powered columns to provide relatively uniform disbursement of the light to the plants. The housing includes an accessory rail to attach a variety of optional accessories and internal cooling fins to cool the housing to prevent damage to the power supply and/or to prevent overheating the plants. In addition, the housing includes a fan and end caps which permit the movement of air for the displacement of heat and reduce the intake of moisture or debris into the interior of the LED growth light.

20 Claims, 29 Drawing Sheets

Related U.S. Application Data

(60) Provisional application No. 62/858,119, filed on Jun. 6, 2019.

(51) Int. Cl.
  *F21V 29/67* (2015.01)
  *F21V 29/75* (2015.01)
  *F21V 29/89* (2015.01)
  *F21V 23/06* (2006.01)
  *F21Y 105/16* (2016.01)
  *F21Y 113/17* (2016.01)
  *F21Y 115/10* (2016.01)

(56) References Cited

U.S. PATENT DOCUMENTS

| | | | |
|---|---|---|---|
| 8,297,782 B2 | 10/2012 | Bafetti et al. | |
| 8,453,376 B2 | 6/2013 | Chen et al. | |
| 8,523,385 B2 | 9/2013 | Lu et al. | |
| 8,549,787 B2 | 10/2013 | Aikala | |
| 8,738,160 B2 | 5/2014 | Bucove et al. | |
| 8,850,743 B2 | 10/2014 | Aikala | |
| 8,882,291 B1 | 11/2014 | Bourget et al. | |
| 9,060,468 B2 | 6/2015 | Klase et al. | |
| 9,137,874 B2 | 9/2015 | Maxik et al. | |
| 9,185,852 B2 | 11/2015 | Aikala et al. | |
| 9,232,700 B2 | 1/2016 | Aikala et al. | |
| 9,282,698 B2 | 3/2016 | Beyer | |
| 9,303,825 B2 | 4/2016 | Boomgaarden et al. | |
| 9,310,027 B2 | 4/2016 | Wells | |
| 9,310,049 B2 | 4/2016 | Wells | |
| 9,318,648 B2 | 4/2016 | Aikala et al. | |
| 9,408,275 B2 | 8/2016 | Maxik et al. | |
| 9,419,177 B2 | 8/2016 | BeVier et al. | |
| 9,450,144 B2 | 9/2016 | Aikala et al. | |
| 9,456,556 B2 | 10/2016 | Aikala et al. | |
| 9,485,920 B2 | 11/2016 | Aikala et al. | |
| 9,516,818 B2 | 12/2016 | Aikala | |
| 9,541,261 B2 | 1/2017 | Klase et al. | |
| 9,666,769 B2 | 5/2017 | Osaki et al. | |
| 9,681,515 B2 | 6/2017 | Rantala | |
| 9,750,105 B2 | 8/2017 | Rantala | |
| 9,788,387 B2 | 10/2017 | Soler et al. | |
| 9,820,447 B2 | 11/2017 | Vilgiate | |
| 9,844,116 B2 | 12/2017 | Soler et al. | |
| 9,854,749 B2 | 1/2018 | Klase et al. | |
| 9,872,357 B1 | 1/2018 | Aikala | |
| 9,883,635 B2 | 2/2018 | Aikala et al. | |
| 9,951,941 B2 | 4/2018 | Klase et al. | |
| 9,961,841 B2 | 5/2018 | Aikala et al. | |
| D822,881 S | 7/2018 | Drew et al. | |
| 10,222,052 B1 | 3/2019 | Ter-Hovhannisyan | |
| 11,668,457 B1* | 6/2023 | Luo | F21V 29/67 |
| | | | 362/294 |
| 2004/0120152 A1 | 6/2004 | Bolta et al. | |
| 2005/0041417 A1 | 2/2005 | Mackin | |
| 2007/0291420 A1 | 12/2007 | Chen | |
| 2010/0103664 A1 | 4/2010 | Simon et al. | |
| 2010/0259190 A1* | 10/2010 | Aikala | H01L 33/507 |
| | | | 257/E33.061 |
| 2010/0284195 A1 | 11/2010 | Liu et al. | |
| 2011/0140059 A1* | 6/2011 | Krone | E06C 7/12 |
| | | | 254/387 |
| 2011/0266282 A1 | 11/2011 | Chu | |
| 2012/0161170 A1* | 6/2012 | Dubuc | A01G 7/045 |
| | | | 257/E33.068 |
| 2013/0294065 A1* | 11/2013 | Wells | F21K 9/00 |
| | | | 362/231 |
| 2015/0128488 A1 | 5/2015 | Casper et al. | |
| 2015/0223403 A1 | 8/2015 | Aikala et al. | |
| 2017/0000041 A1 | 1/2017 | Wargent | |
| 2018/0014374 A1 | 1/2018 | Rhodes et al. | |
| 2018/0054974 A1 | 3/2018 | Vasilenko | |
| 2018/0070421 A1 | 3/2018 | Soler et al. | |
| 2018/0070537 A1 | 3/2018 | Vasilendko | |
| 2018/0177017 A1 | 6/2018 | Soler et al. | |
| 2018/0238501 A1* | 8/2018 | Honda | F21V 31/005 |
| 2020/0116110 A1* | 4/2020 | Blas Martinez | F02M 25/089 |
| 2020/0386396 A1* | 12/2020 | Wolfe | A01G 9/249 |

\* cited by examiner

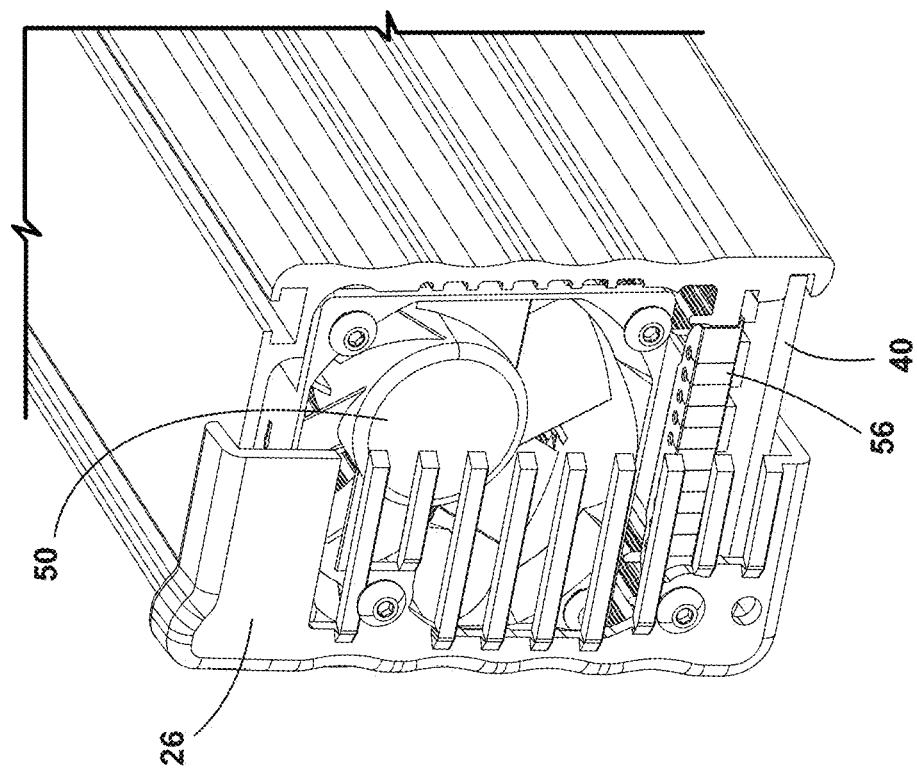
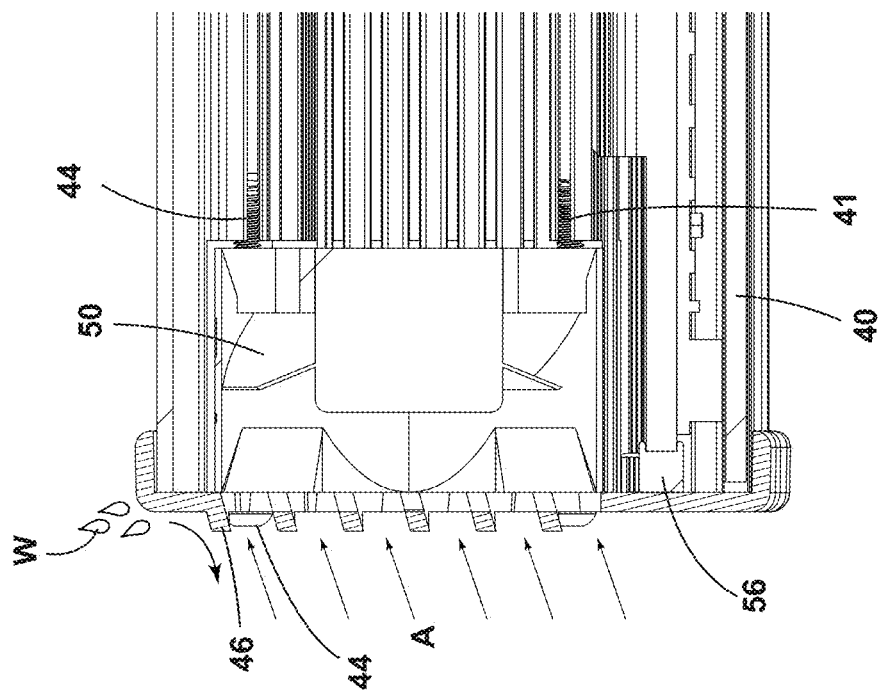
FIG. 22

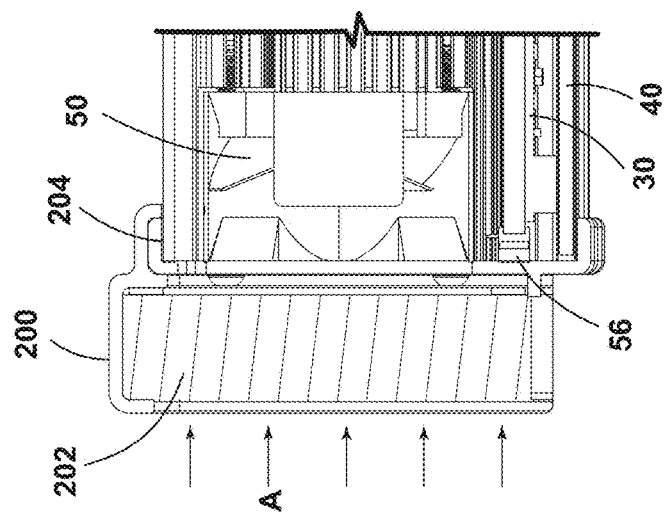
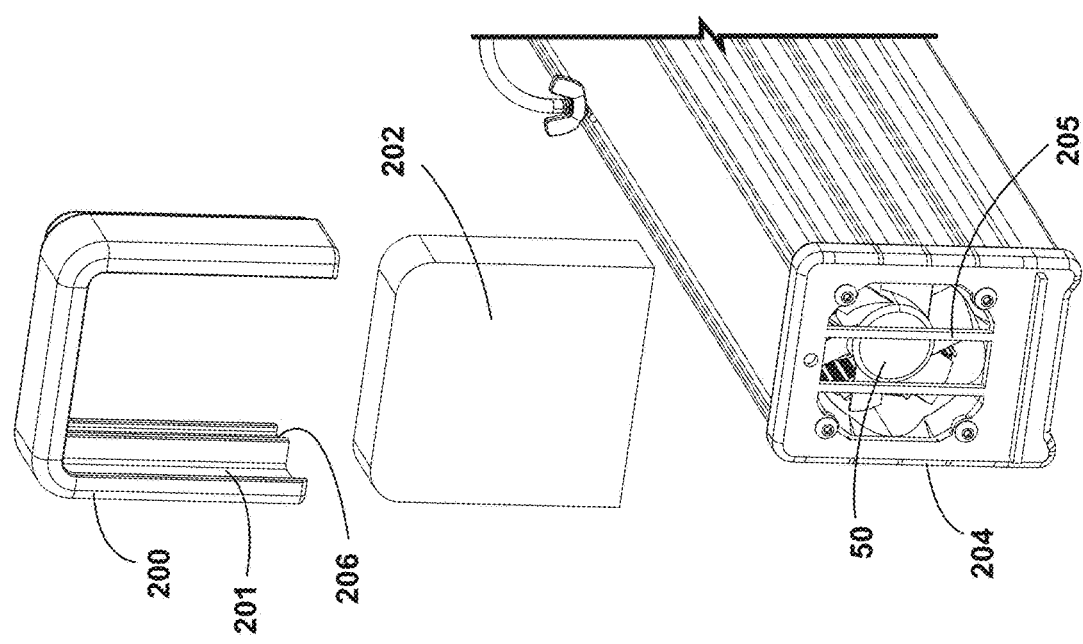
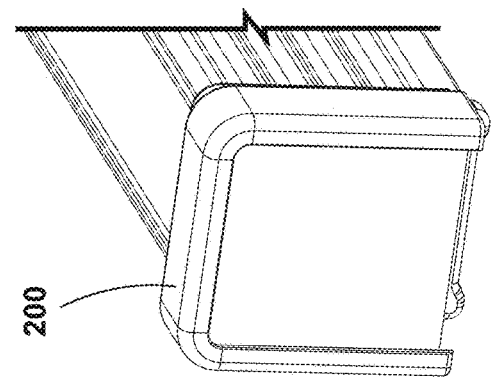
FIG. 24
FIG. 25
FIG. 26

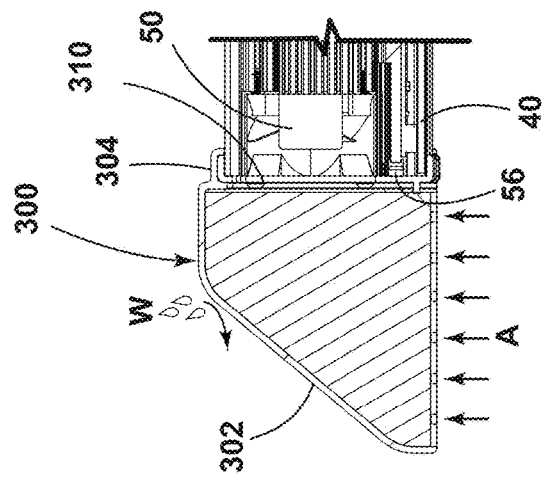
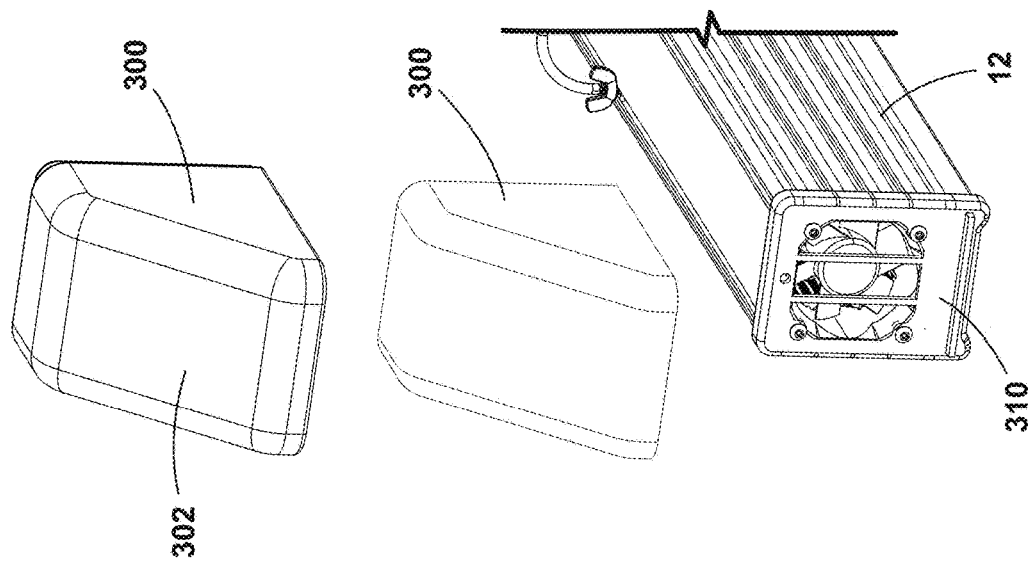
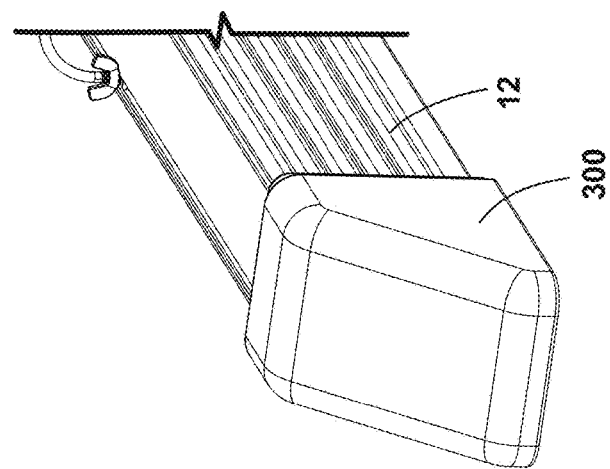

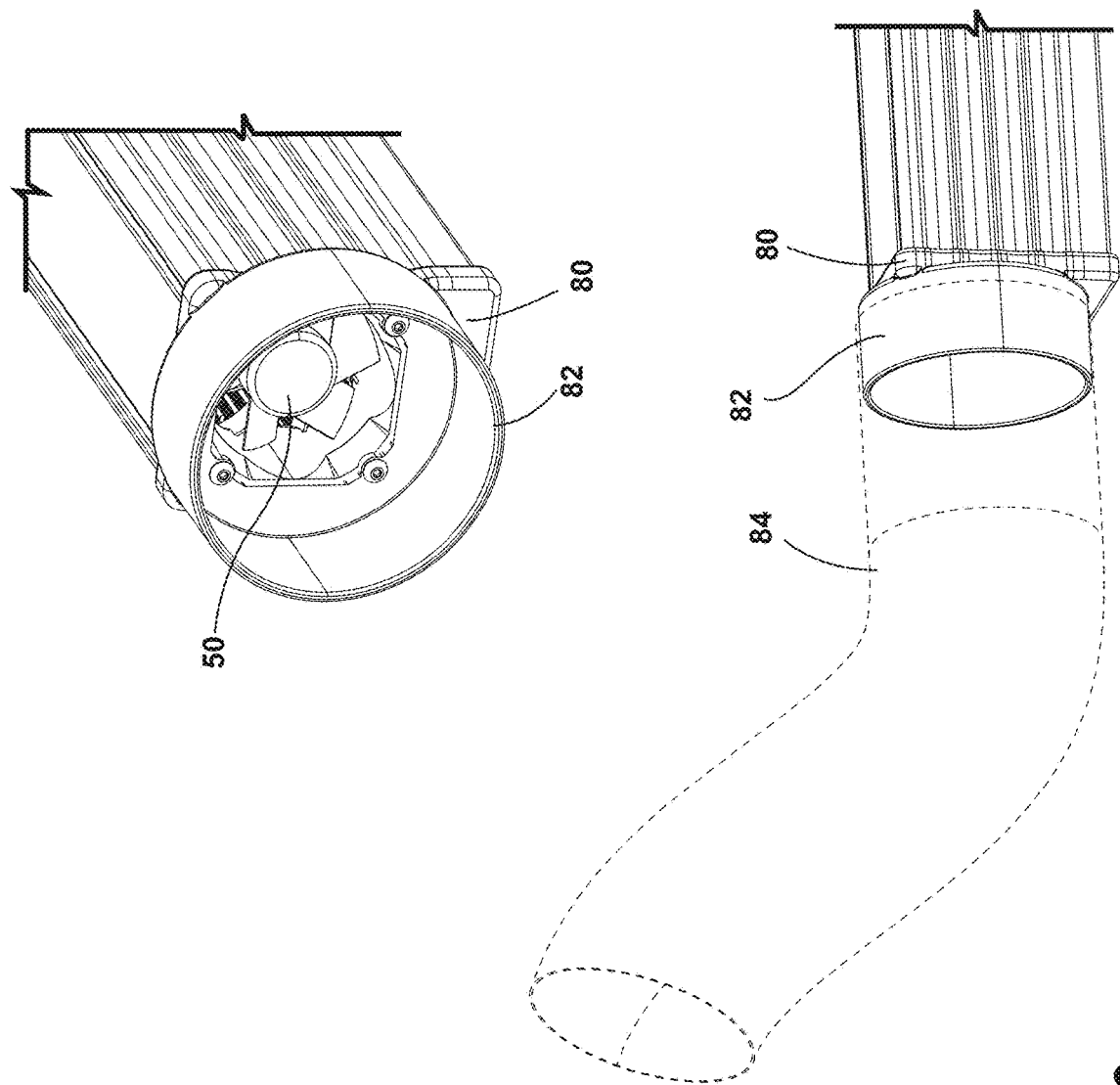

Algorithm w Examples

As you see from Example C, we go from Left to Right or Right to left across Columns, no matter column count as long as spacing of columns dont exceed distance between placements We take          5     or          10 and ADD +1   THEN Divide into the Segments available (Linear Length) (25) or
                                                  (40) or Any Linear Length segments Notice the Selections are in the CENTER of the Segments available. NOT offset to 1 side or the other
This enables us to Focus the HIGHEST Priority of specific Color to the Center majority and absolute Mathematical Even Natural Blending diffusion photometric evenness Irrelevant to Column count, or Rows (Linear Length) Points, this Algorithm Applies to All combinations

FIG. 36

LED GROWTH LIGHT

CROSS REFERENCE TO RELATED APPLICATION

This application is a continuation of and claims priority under 35 U.S.C. § 120 to commonly assigned U.S. Pat. No. 11,402,089 issued Aug. 2, 2022, entitled LED GROWTH LIGHT, which claims the priority benefits under the provisions of 35 U.S.C. § 119, basing said claim of priority on related U.S. Provisional Application No. 62/858,119 filed Jun. 6, 2019, which is incorporated in its entirety herein by reference.

BACKGROUND OF THE INVENTION

The present invention relates to the field of growing plants. More specifically, the present invention relates to Light Emitting Diode (LED) growth lights for growing plants.

Artificial lights for growing plants are known in the art. These artificial lights can be used to supplement natural light or even used in lieu of natural light. Plants are able to capture light energy and use it to promote plant growth. Prior art plant growth lights include, among other things, high pressure sodium or fluorescent style lamps. However, these growth lights can generate heat that could harm the plants, require significant electricity, require frequent bulb replacement, and are generally limited in the scope of wave lengths of light which could be provided to the plants.

While such prior growth lights have been proven to be generally successful, further improvements and enhancements to the same, would be advantageous and are described herein.

SUMMARY OF THE INVENTION

One aspect of the present invention is a growth light with a housing having an exterior surface with a first end, a second end, side surfaces connecting the first end and the second end, a lower surface, and an upper surface. The housing has at least one printed circuit board slot for receiving a printed circuit board. In addition, the housing has at least one lens slot for receiving a lens. The housing also has at least one internal slot for receiving a power supply and a plurality of internal fins for dissipating heat. The first end cap is coupled to the first end of the housing, and the second end cap is coupled to the second end of the housing. A plurality of LED chips are arranged on the printed circuit board. The power supply powers the printed circuit board. A lens is received in the lens slot to protect and cover the LED chips.

Another aspect of the present invention is an LED growth light. The LED growth light has a housing with an exterior surface, having a first end, a second end, side surfaces, a lower surface, and an upper surface. A first end cap is coupled to the first end of the housing. The LED growth light also has a printed circuit board with five columns of LED chips. Two of the columns provide light in a range of 551 to 2000 nanometers. Two of the columns provide light in a range of 100 to 550 nanometers. A single column includes white LED chips. The LED growth light has a power source that receives power from outside of the housing and supplies power to the printed circuit board such that each of the five columns of LED chips can be individually powered. A lens is coupled to the housing to cover the LED chips.

Yet another aspect of the present invention is an LED growth light that has a housing with an exterior surface with a first end, a second end, and at least one side surface. The housing also has a lower surface and an upper surface. The LED growth light has a printed circuit board with five individually powered columns of LED chips. Two columns providing light in a range of 551 to 2000 nanometers, two columns providing light in the range of 100 to 550 nanometers, and a fifth column that includes a plurality of white LED chips. A power source is coupled to an interior surface of the housing and provides power to the printed circuit board. The LED growth light includes a communication interface that communicates with a device network that permits the control of the printed circuit board such that each individually powered columns of LED chips can be individually turned up or down. A lens is coupled to the housing to cover the LED chips.

These and other advantages of the invention will be further understood and appreciated by those skilled in the art by reference to the following written specification, claims, and appended drawings.

BRIEF DESCRIPTION OF THE DRAWINGS

FIG. 22 are partial cross-sectional views of the first end of the LED growth light shown in FIG. 1;

FIG. 24 is a partial front view of an alternative cap and filter assembly for the first end of an LED growth light;

FIG. 25 is an exploded view of the components of the end cap and filter assembly shown in FIG. 24;

FIG. 26 is a partial side cross-sectional view of the filter and cap assembly shown in FIG. 24;

FIG. 27 is a front partial perspective view of a hood;

FIG. 28 is a partial exploded front view of the hood shown in FIG. 27;

FIG. 29 is a partial cross-sectional view of the hood shown in FIG. 27;

FIG. 30 are views of the end cap shown in FIG. 16 installed to the first end of the LED growth light;

FIG. 36 is an illustration of an exemplary algorithm.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
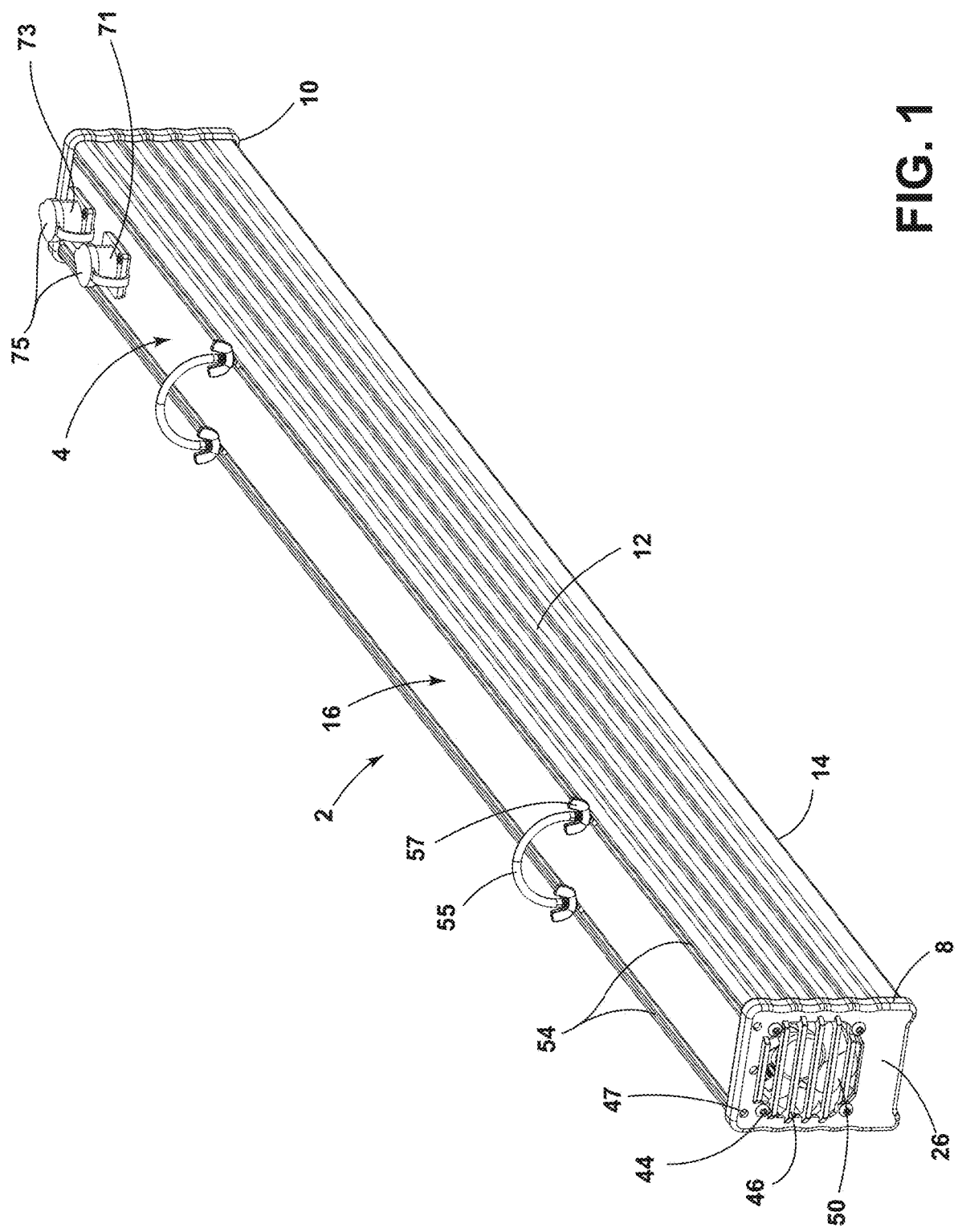
FIG. 1 is a top perspective view of an LED growth light embodying one aspect of the present invention.
Figure 2:
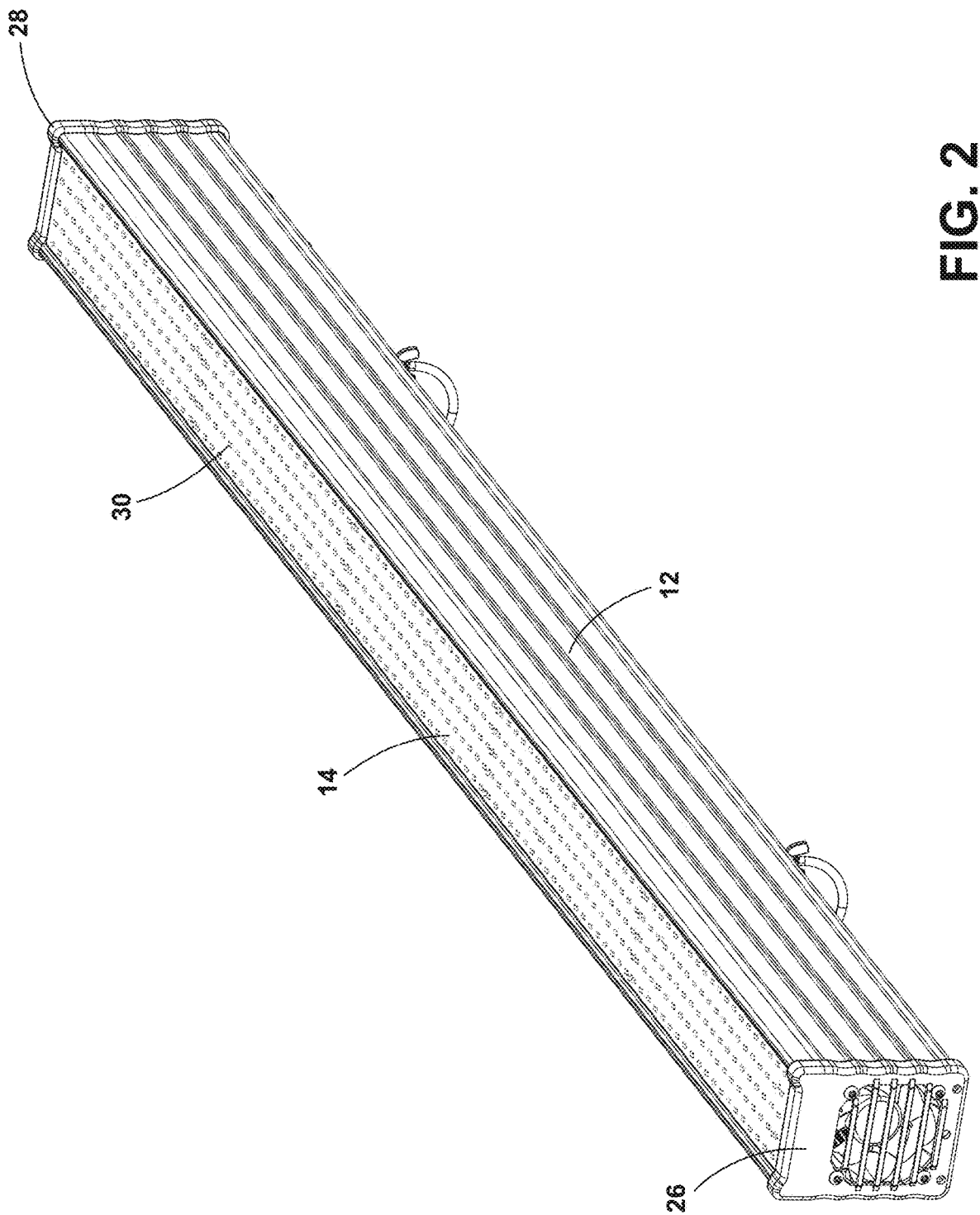
FIG. 2 is a bottom perspective view of the LED growth light shown in FIG. 1.
Figure 3:
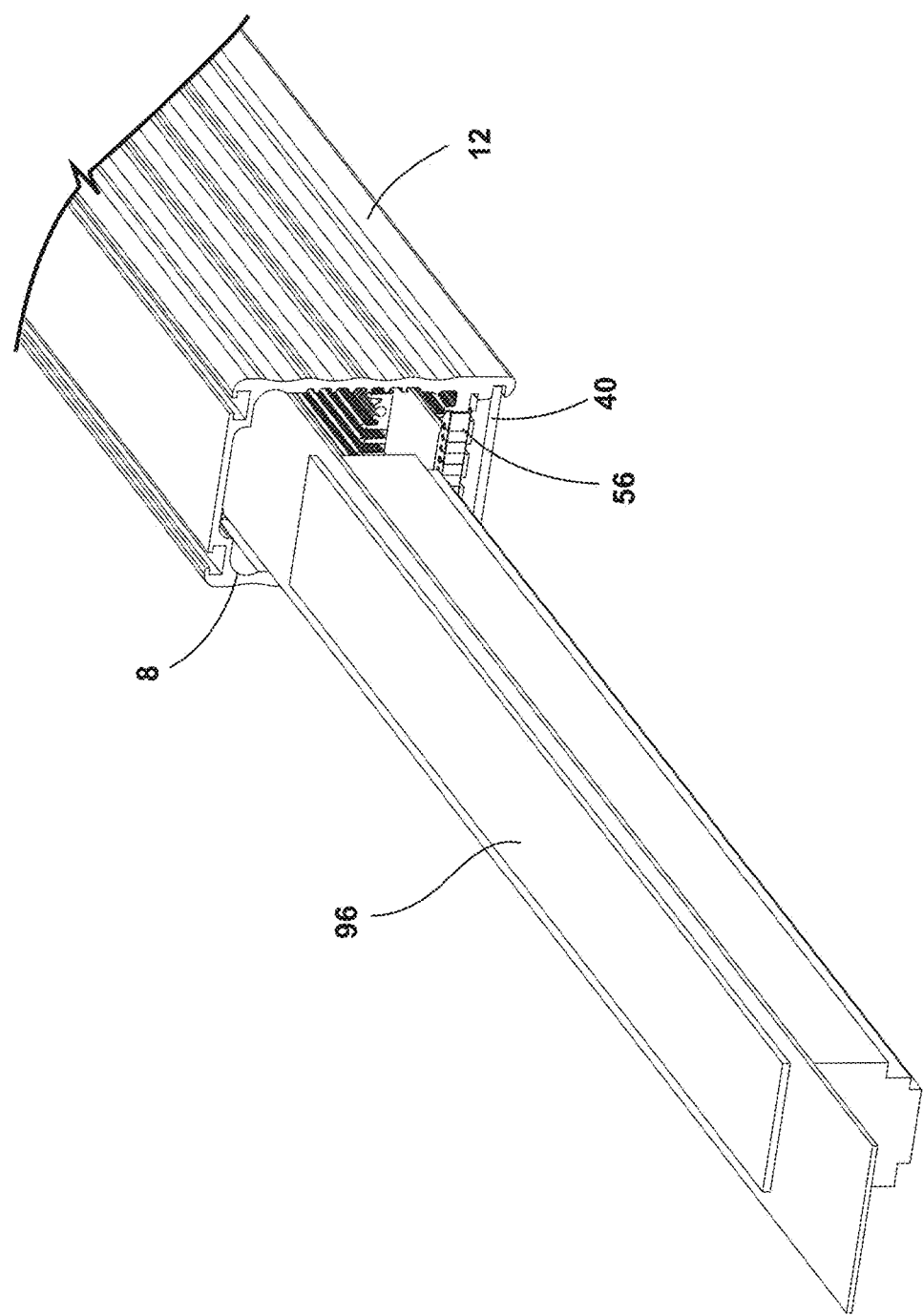
FIG. 3 is a partial front perspective view of the power source being inserted into the LED growth light of FIG. 1.
Figure 4:
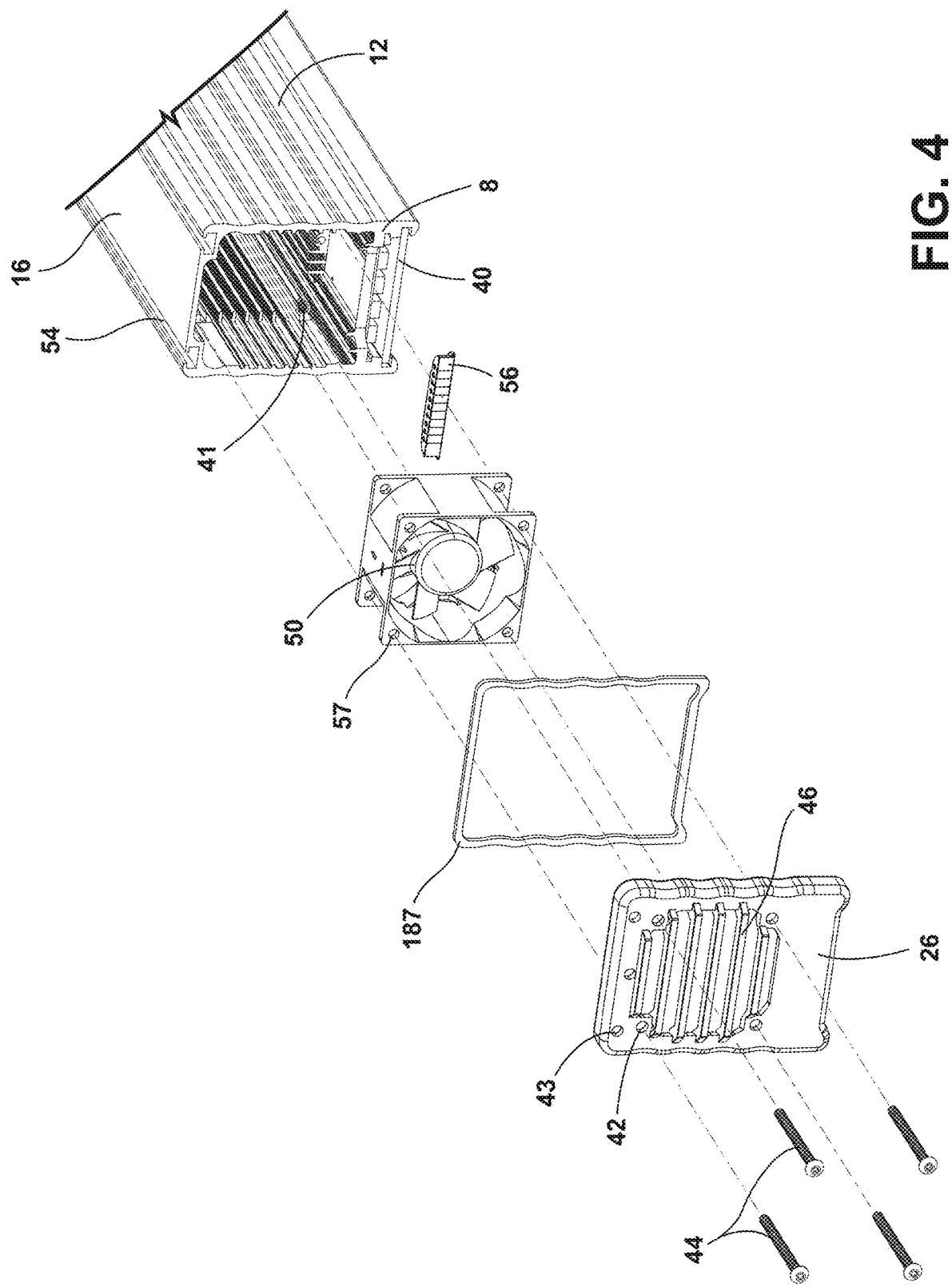
FIG. 4 is a partial exploded front perspective view of the LED growth light shown in FIG. 1.

An embodiment of the LED growth light 2 is shown in FIG. 1. The LED growth light 2 has a housing 4 with an exterior surface 6, a first end 8, and a second end 10. The exterior surface 6 of the housing 4 also includes side surfaces 12 that connect the first end 8 and second end 10. The housing 4 also includes a lower surface 14 and an upper surface 16. In the illustrated embodiment, the side surfaces 12 include an undulating or waved design. The undulating or waved side surfaces 12 will assist in reflecting sunlight or artificial light into a larger area providing for more uniform dispersion of lighting and to help eliminate hot spots that can damage plants.

The housing 4 also has at least one printed circuit board slot 18 for receiving a printed circuit board 30. In the illustrated embodiment, the housing 4 has a pair of generally parallel printed circuit board slots 18 that run generally along the entire length of the housing 4 on the internal side of each of the internal side surfaces 12. The housing 4 also has a lens slot 20 for receiving a lens. The lens slots 20 are positioned below the printed circuit board slots 18 when the LED growth light 2 is in a generally horizontal position. In the illustrated embodiment, the housing 4 has a pair of lens slots 20 that are generally parallel and run along the entire length of the housing 4 on the inside of the side surfaces 12. In the illustrated embodiment, there are a pair of internal slots 22 for receiving power supply 96 that are spaced generally parallel to each other and are located on the inside of side surfaces 12. The housing 4 also has a plurality of internal fins 24 for dissipating heat. The internal fins 24 have a relatively thin profile to increase the surface area to dissipate heat generated by the printed circuit board 30 and/or power supply 96. As shown in the illustrated embodiments, the internal fins 24 can have different lengths, tapers, and spacing. For example, the fins 24 can include one or more tapered surfaces. Additional cooling features can be included, such as ceramic wafers, thermal electrical cooling fans 50, and closed loop liquid cooling systems.

In the illustrated embodiment, the housing 4 is a single piece of material. The housing 4 can be made of any suitable material by stamping, molding, extruding, milling, machining, or other process. In the illustrated embodiment, the housing 4 is an extruded powder-coated aluminum housing 4, that can include a surface finish, such as paint, powder coating, and/or reflective finish.

The housing 4 also includes accessory rails 54 located on the upper surface 16 of the housing 4. The accessory rails 54 are located on the lateral sides of the upper surface 16 and run the entire length of the housing 4 in the illustrated embodiment. The accessory rails 54 have a generally inverted "T" shape. Accessories, such as sensors, mirrors, water lines, misters, height adjustment mechanisms, shields, supplemental lighting, and other objects can be attached to the channels of the accessory rails 54. Sensors can include temperature, humidity, light, and other sensors that measure a parameter about the plant and/or its surrounding environment. Watering tubing can be run in one or both of the accessory rails 54. Such tubing can be heated by the heat generated by the power source 96 and/or by the printed circuit board 30. The end caps 26, 28 also have openings 47 that are generally aligned with the accessory rails 54 to permit tubing or other objects in accessory rails 54 to extend beyond the end caps 26, 28.

While the illustrated embodiment has a generally rectangular housing 4, any sort of tubular design can be advantageously used. For example, a closed loop aluminum housing 4 with or without enclosing the power source would be suitable, even if it has no rectangular cross sections.

Figure 21:
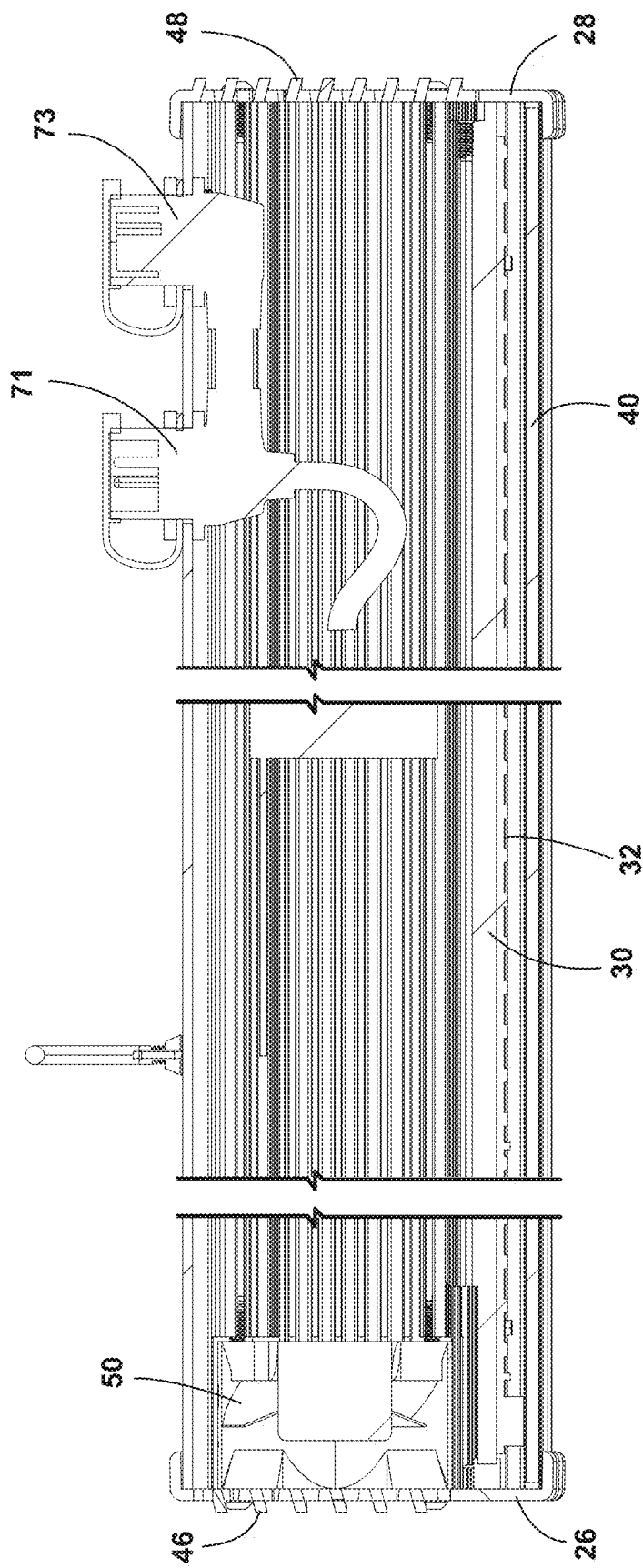
FIG. 21 is a partial cross-sectional side view of the LED growth light of FIG. 1 illustrating some of the internal components.

The first end 8 of the housing 4 is covered with an end cap 26. The end cap 26 is secured to the first end 8 of the housing 4 by use of fasteners 44 that are inserted through fastener openings 42 in the first end cap 26 and are coupled to the fastener apertures 41 in the first end 8 of the housing 4. The first end cap 26 can include a plurality of louvres 46 to help direct air into or from the interior of housing 4. In one illustrated embodiment (FIG. 21), louvres 46 of first end cap 26 are angled downward so as to reduce and/or prevent the entry of water W or debris into the interior of housing 4. As illustrated in FIG. 22, water W can be deflected given the angle of the upper louvre 46. The angles of the louvres 46 can also help reduce the sound generated by the fan 50 and/or the other components of the LED growth light 2.

Figure 23:
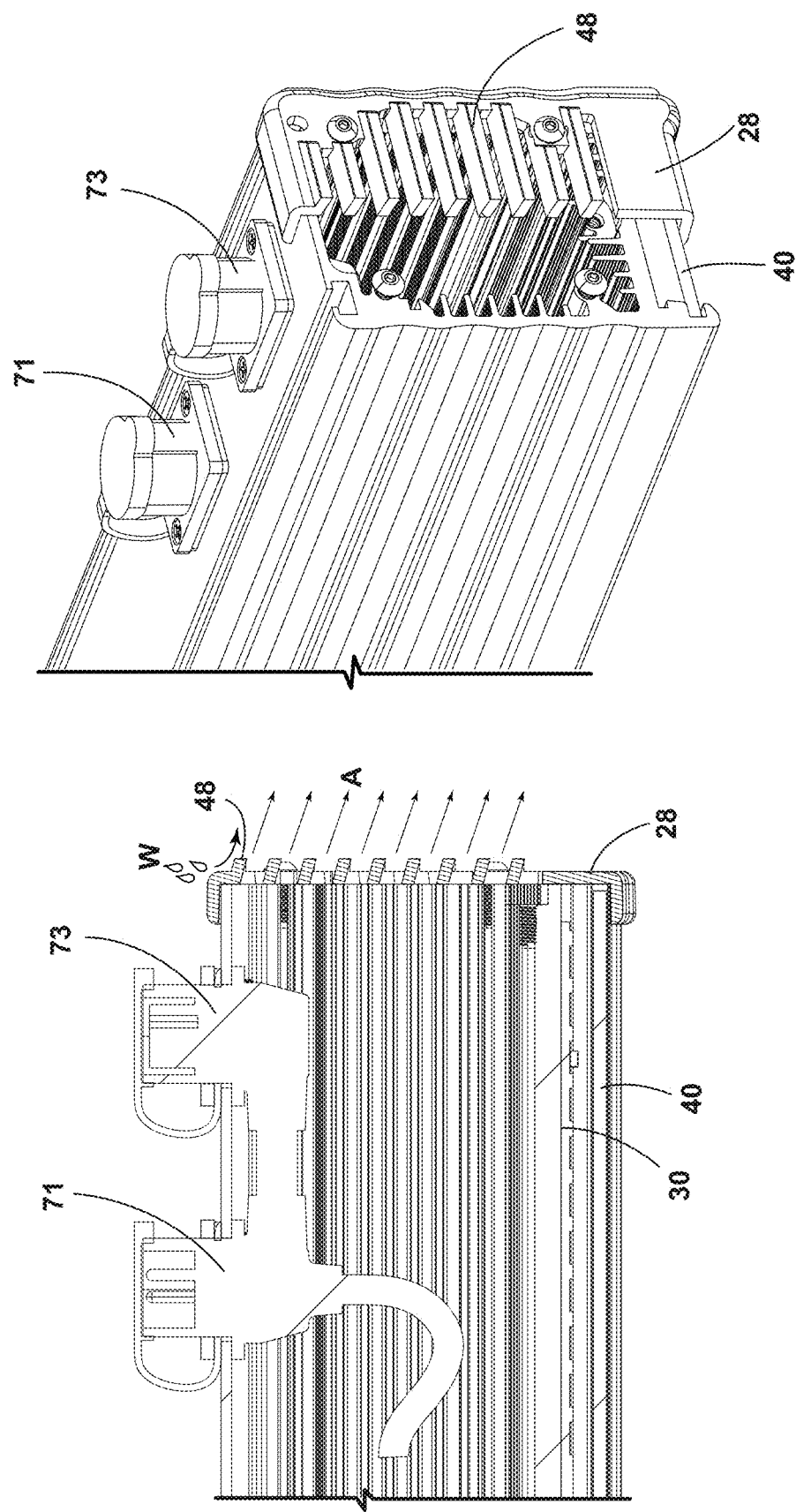
FIG. 23 are partial cross-sectional views of the second end of the LED growth light shown in FIG. 1.

A second end cap 28 is coupled to the second end 10 of the housing 4. Again, fasteners 44 are received through the fastener openings 42 in the second end cap 28 and coupled to fastener apertures 41 in the second end 10 of the housing 4. Again, the louvres 48 of the second end cap 28 can be angled to direct the air flowing into or exiting the interior of the housing 4. In addition, as illustrated in FIG. 23, the water W can be diverted from entering into the interior of housing 4 due to the angle of the top louvre 48.

A gasket 187 can be used to create a seal to prevent moisture or debris from entering at end caps 26, 28. The gasket 187 can be made from any suitable material that will provide a seal, including polymeric materials such as rubber.

The fan 50 can be any conventional fan 50. In the illustrated embodiment of FIG. 22, the fan 50 pulls air A into the first end 8 of the housing 4. Fan 50 can also be powered to draw air out from the housing 4 and displace it outwardly from the first end 8 of the housing 4. This can be accomplished by changing the direction of the movement of the blades of the fan 50. The fan 50 can have multiple speed settings that can be activated by changing the fan settings on the fan 50 or via a remote device.

Figure 8:
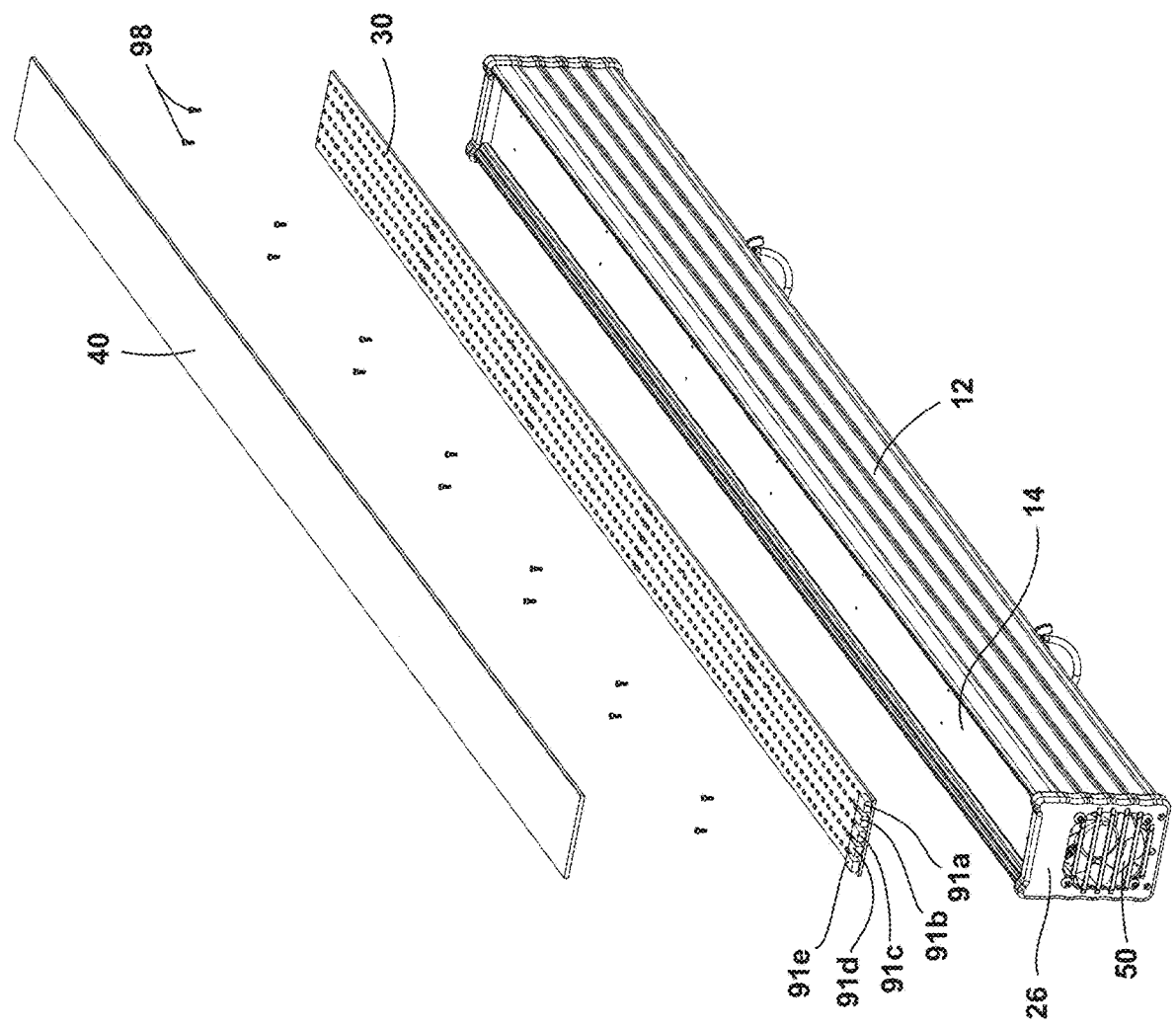
FIG. 8 is an exploded bottom perspective view of the LED growth light shown in FIG. 1.
Figure 9:
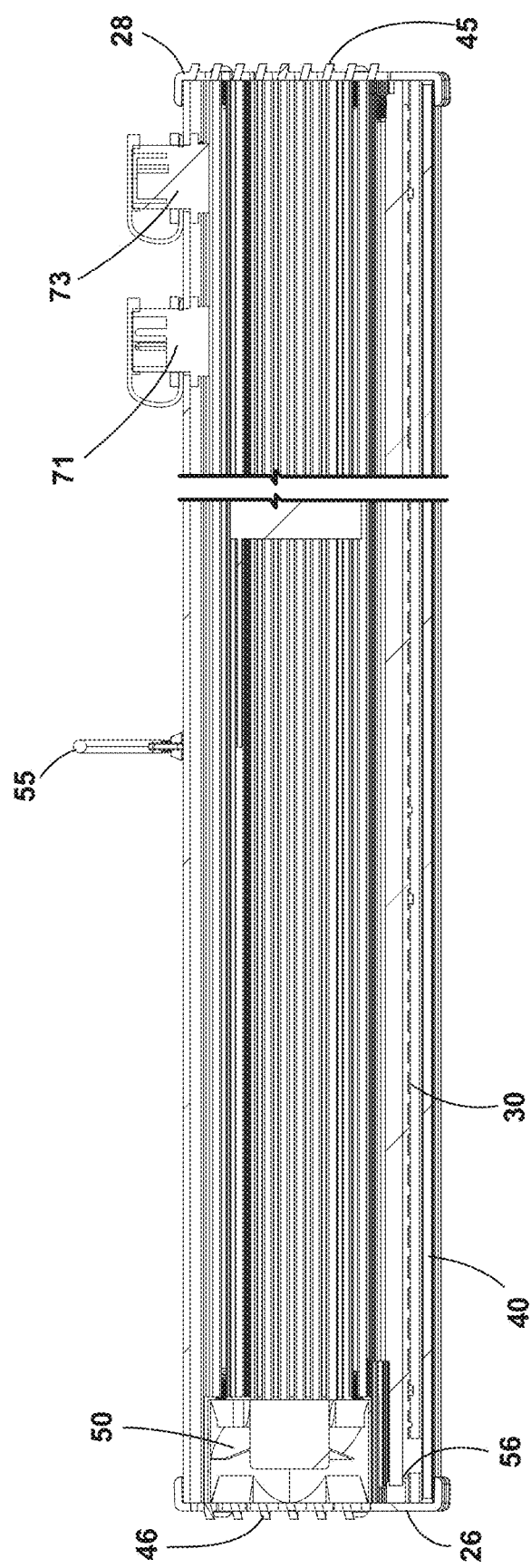
FIG. 9 is a partial side cross-sectional view showing some of the internal components of the LED growth light shown in FIG. 1.
Figure 10:
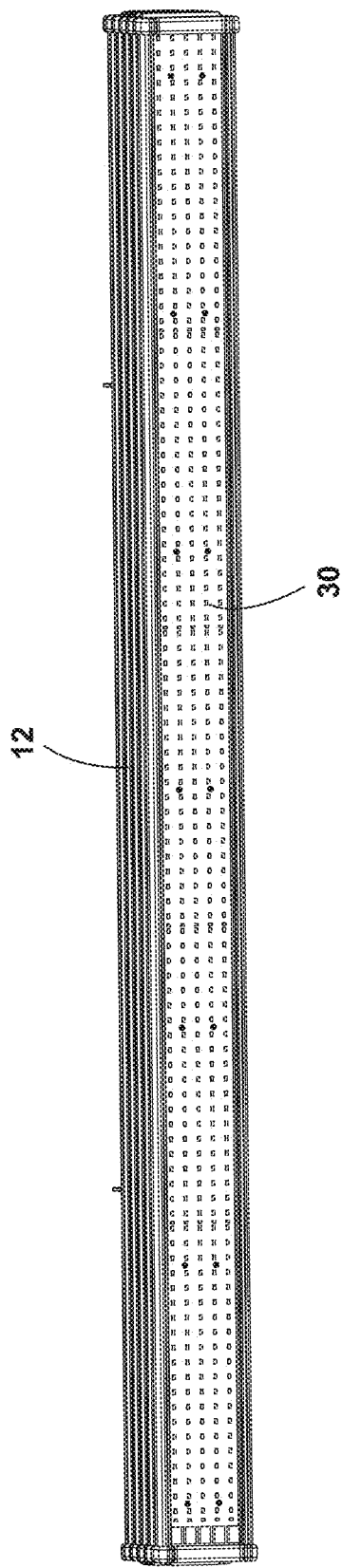
FIG. 10 is a bottom perspective view of the LED growth light shown in FIG. 1.
Figure 11:
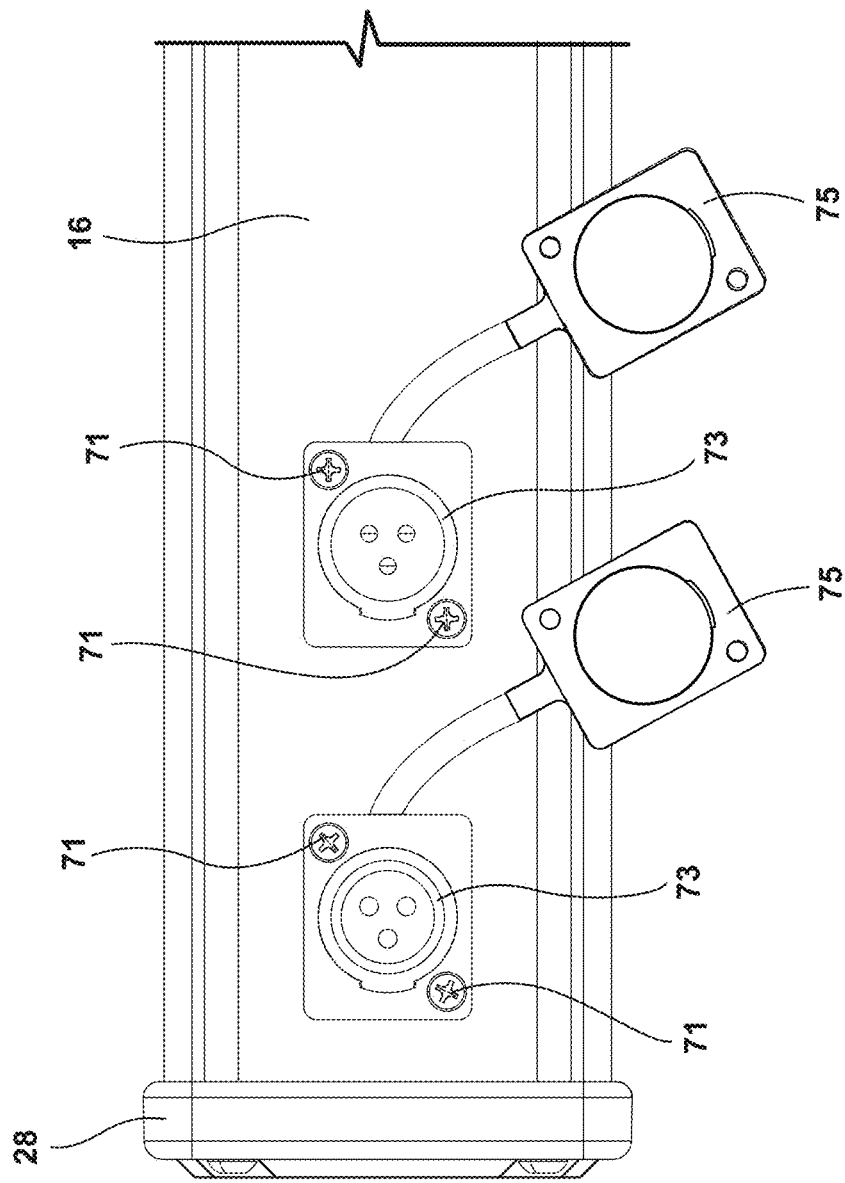
FIG. 11 is a partial top view of the rear portion of the LED growth light shown in FIG. 1.
Figure 14:
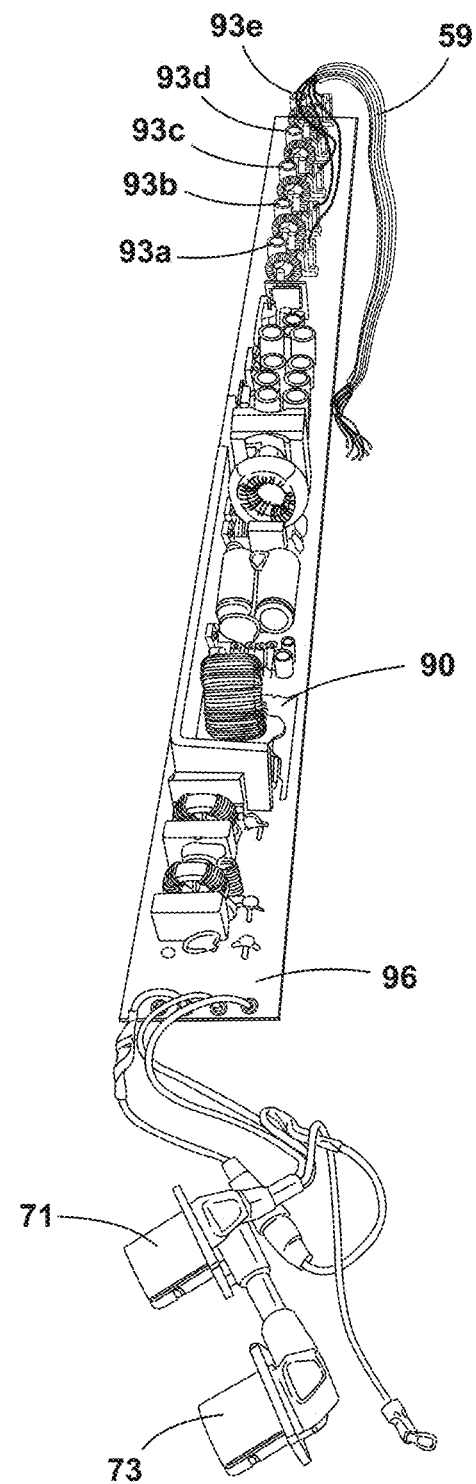
FIG. 14 is a top perspective view of one embodiment of the power supply of the LED growth light shown in FIG. 1.
Figure 15:
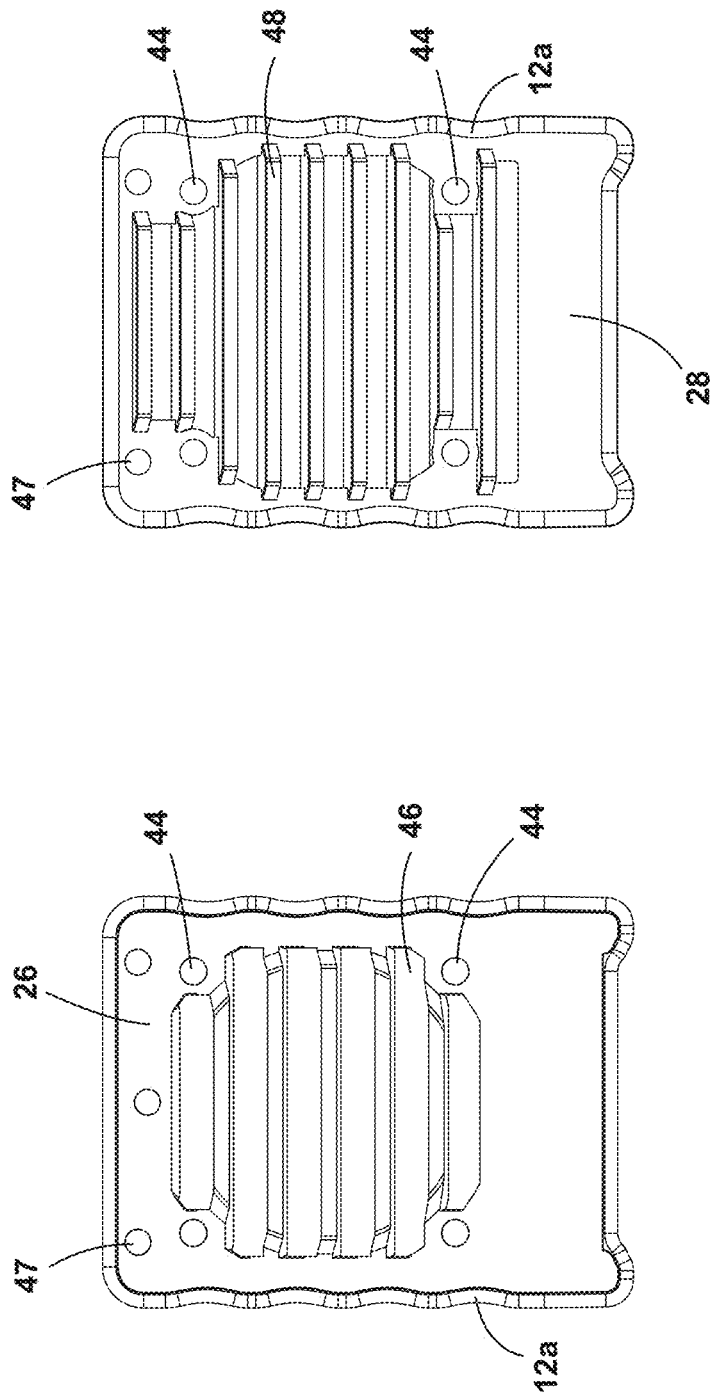
FIG. 15 is an elevational view of one embodiment of the end caps used in the LED growth light shown in FIG. 1.
Figure 16:
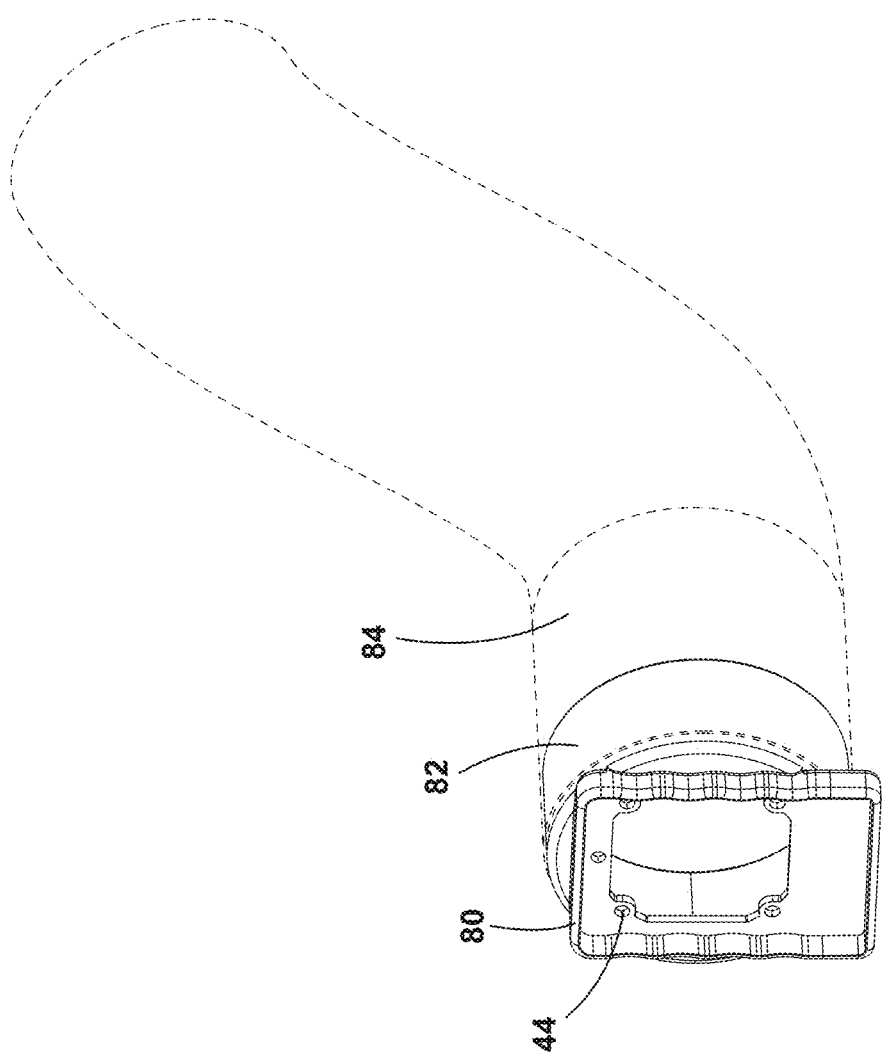
FIG. 16 is an alternative embodiment of an end cap that can connect to a duct or tube.
Figure 17:
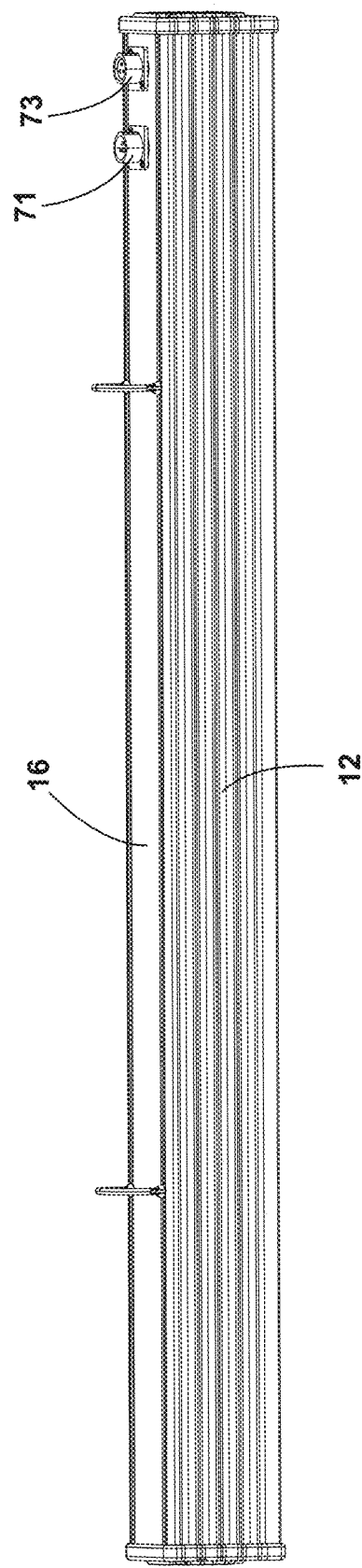
FIG. 17 is a side elevational view of the LED growth light shown in FIG. 1.
Figure 19:
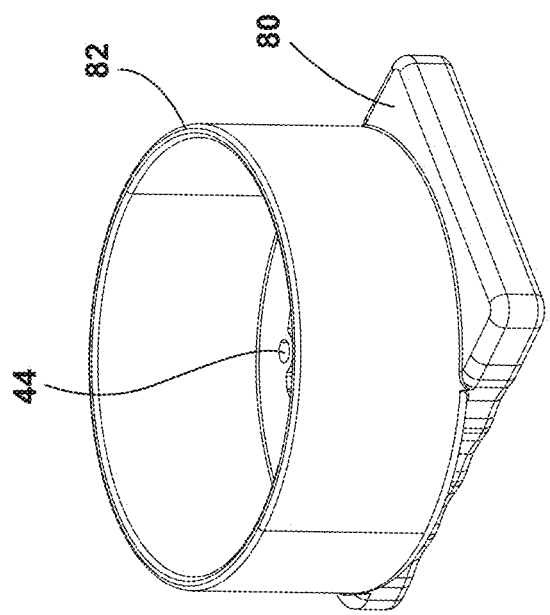
FIG. 19 is a side perspective view of the end cap shown in FIG. 16.
Figure 18:
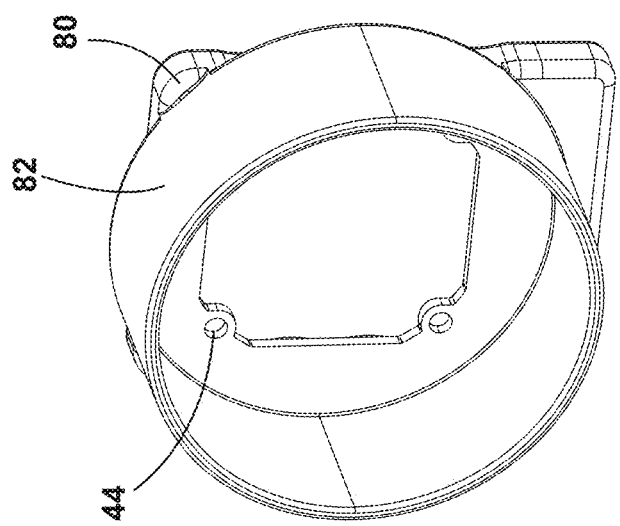
FIG. 18 is a front perspective view of the end cap shown in FIG. 16.

The printed circuit board 30 includes a plurality of LED chips 32. In the illustrated embodiment, the LED chips 32 are arranged in five columns 91a-91e on the printed circuit board 30. These five columns 91a-91e are individually powered by power source 96. As illustrated in FIG. 14, the power source 96 includes separate power supply 93a-93e for the five columns 91a-91e. The printed circuit board 30 can be coupled to the housing 4 by fasteners 98, as shown in FIG. 8.

In the illustrated embodiment, there are two "blue columns," two "red columns," and one "white column." The five individual columns 91a-91e of lights can be turned up or turned down, depending upon the user's preference. Moreover, individual LED chips 32 or groups of LED chips 32 within the five columns 91a-91e can be turned up or turned down, depending upon the user's preference. The array of the LED chips 32 is shown below. Thus, first column 91a could be a column of red, providing light in a range of 551 to 2000 nanometers. The second column 91b can be a column of blue, providing light in a range of 100 to 550 nanometers. The middle column 91c can include "white" lights in a full spectrum that may include green light in the 540 to 550 nanometer range. The fourth column 91d can be a column of red, providing light in the range of 551 to 2000 nanometer spectrum. The fifth column 91e can be a column of blue, providing light in the range of 100 to 550 nanometers.

Within the column of blues are multiple cyan chips, spaced apart to provide light in a 490 to 510 nanometer range. Within the white column is a green LED that provides light in approximately the 540 to 555 nanometer range. Again, these greens are spaced apart within that column. Within the red column, chips can be included to provide a light spectrum in excess of 830 nanometers, up to 2000 nanometers within the infrared spectrum to potentially provide heat and, more importantly, soil penetration to roots. Within the blue columns there may also be UV lights having less than a 300 nanometer range, down to 100 nanometers.

The spacing of the particular LED chips 32 in the blue columns and red columns is staggered such that, for example, the chips that provide the cyan wavelength would be spaced within the second column 91b and the fifth column 91e, but staggered in those columns. For example, if the cyan chip was located in the third, twenty-third, forty-third, etc. spots within the second column 91b, the cyan chip could be located in the thirteenth, thirty-third, fifty-third, etc., position in the fifth column 91e.

The housing 4 is approximately 48" in length, and the printed circuit board 30 is approximately 45 3/16"×2 1/4" with 500 LED chips 32 with the same number of LED chips 32 in each column. Thus, if there are 500 LED chips 32, each of the five columns 91a-91e has 100 chips. However, it is not necessary to have the exact same number of chips in each column. The spacing of the chips and the alternating columns provides relatively uniform distribution of the different wave lengths of the lighting provided by each column, such that all of the plants located underneath the LED growth light 2 are provided with relatively the same amount of light and the same type of light. While the illustrated embodiment shows two "red" columns, two "blue" columns, and one "white" column, the ultimate arrangement of the columns could be one red, one blue, and three white columns; one blue, two red, and two white columns; two white, one red, and two blue columns. In addition, there could be any number of columns to provide the LED lights for the desired spectrum. For example, the printed circuit board 30 could have two or more columns, and the number of "red" or "blue" columns could be zero to more than two. In addition, "red" or "blue" light could be removed entirely from the printed circuit board 30 and/or added as supplemental light extending from one or both of the accessory rails 54. While the illustrated embodiment has a 45 3/16"×2 1/4" printed circuit board 30, any size board, or combination of boards, can be used. This could result in a change in the quantity of LED chips 32 and columns of LED chips 32.

Examples of the Algorithm for LED chip 32 placement are shown in FIGS. 32-36. The placement of LED chips 32 helps diffuse the light generated by the columns 91a-91e of LED chips 32 to create a linear dispersement of light. This linear dispersement results in the diffusion of the light generated by the LED chips 32 to the natural light spectrum. Light generated from the columns 91a-91e will be blended before reaching the plants and, therefore, there will be no hotspots created by light generated by the columns 91a-91e.

The controls can allow a user to create peaks within certain nanometer ranges within the emission spectrum. Thus, the user could turn up or dim the various columns or specific LED chips 32 individually or in groups to create different peaks. As an example, the peaks can be in a blue range, a red range, and/or a white range or any other desirable configuration.

While the LED growth light 2 will be positioned generally above a plant, the housing could be angled if desired to direct the light toward or away from certain plants.

The emission spectrum generated by the LED growth lights 2 is designed to help with the photosynthesis of the plants. Thus, the emission spectrum can be programmed to provide light to plants in the PAR (Photosynthetically active radiation) and other regions of the spectrum. This can provide different durations, sequences, and types of light for different plants and/or stages of growth.

Prior art arrangements of growth lights resulted in non-uniform distribution of lights, such that individual red, blue, or white sections could be seen underneath the lamps, resulting in hot spots, damage to the plants, or non-uniform growth of the plants. The five columns 91a-91e and staggering of the various LED chips 32 (producing light within a certain spectrum) permits the present LED board to provide the light in a relatively uniform distribution. The LED chips 32 can be underpowered to extend the life of the LED chips 32. For example, the LED chips 32 can be 5 w chips that are powered at 2 w or 3 w chips that are powered at 1 w.

Figure 5:
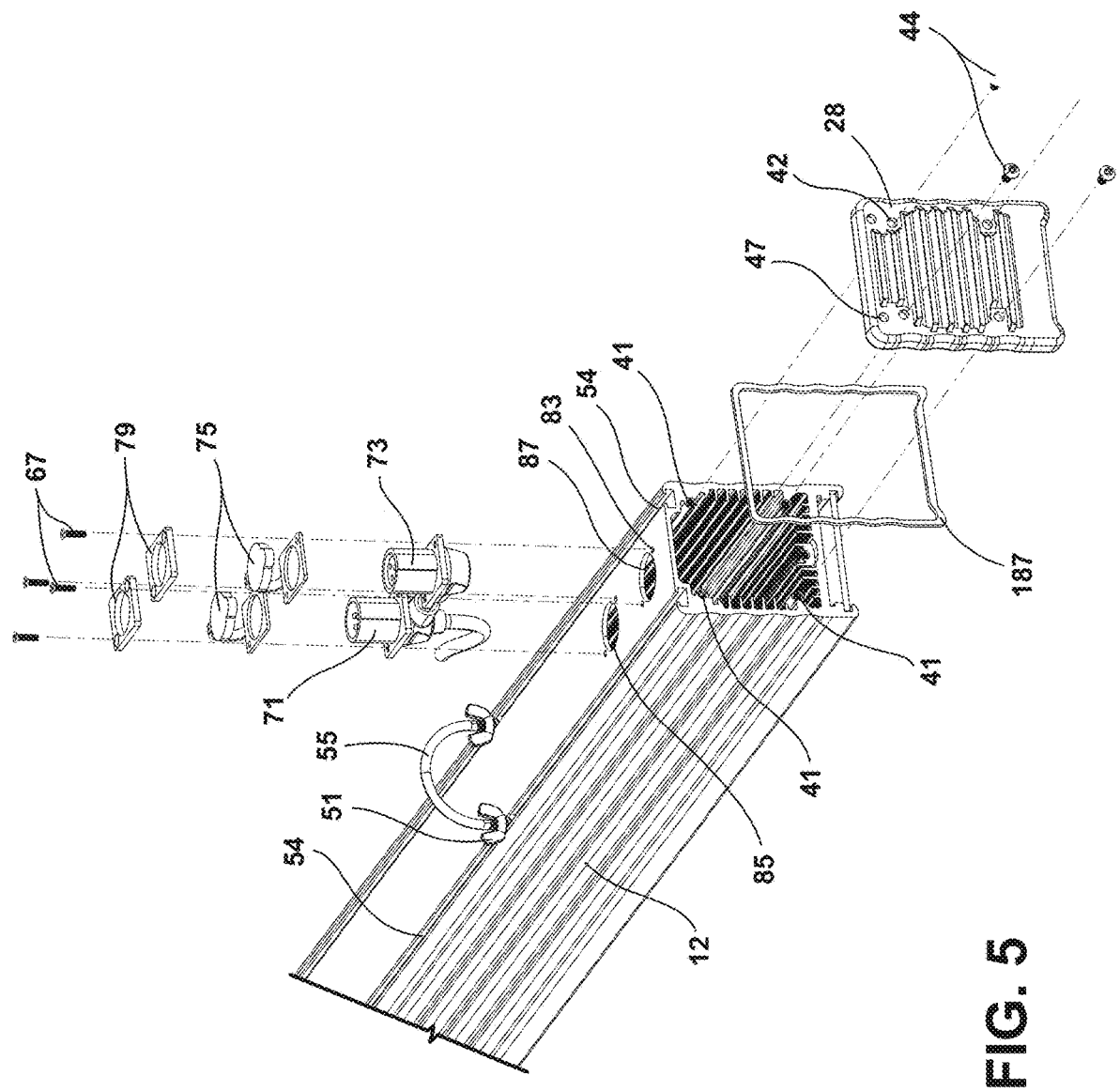
FIG. 5 is a partial exploded back perspective view of the LED growth light shown in FIG. 1.
Figure 6:
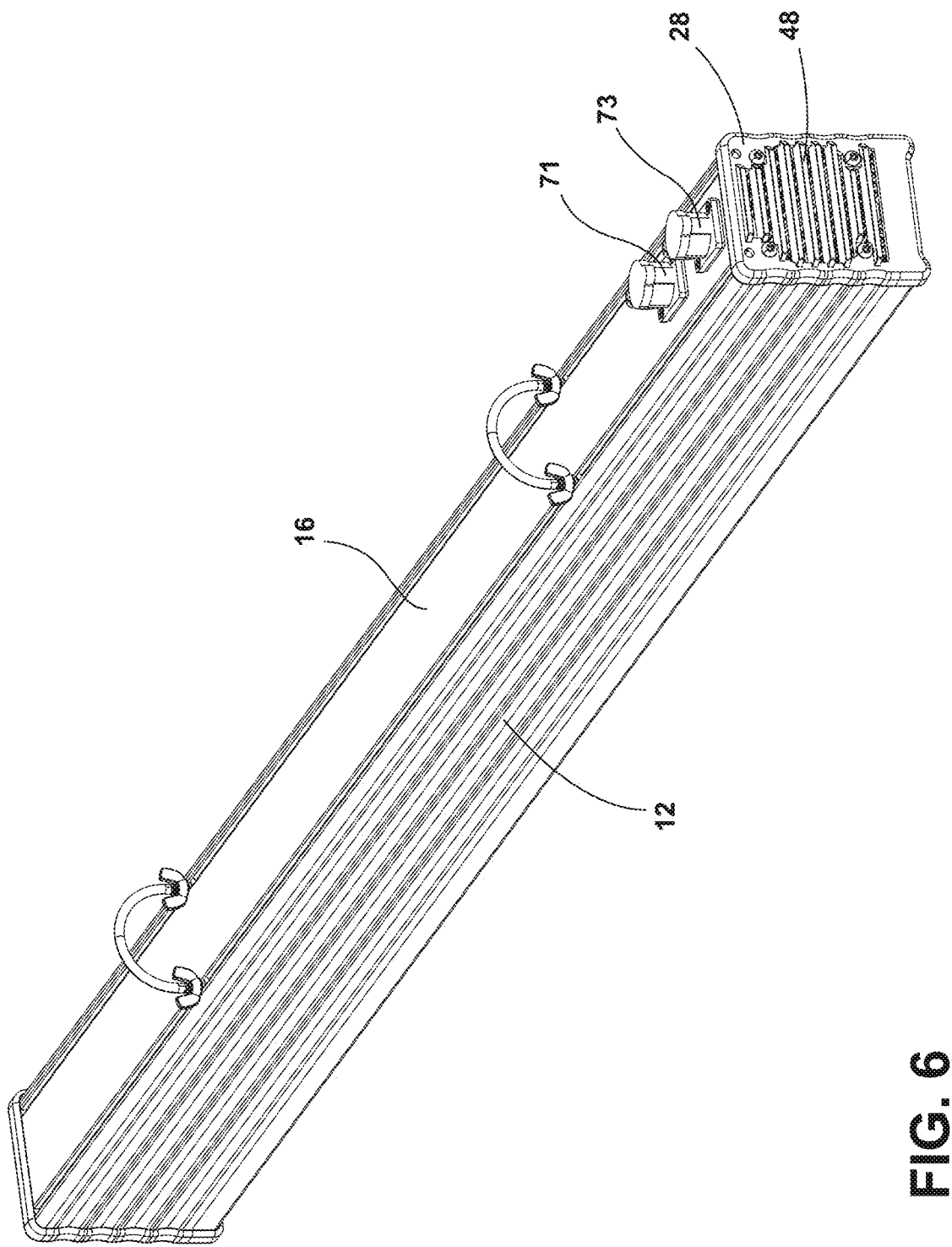
FIG. 6 is a back perspective view of the LED growth light shown in FIG. 1.
Figure 7:
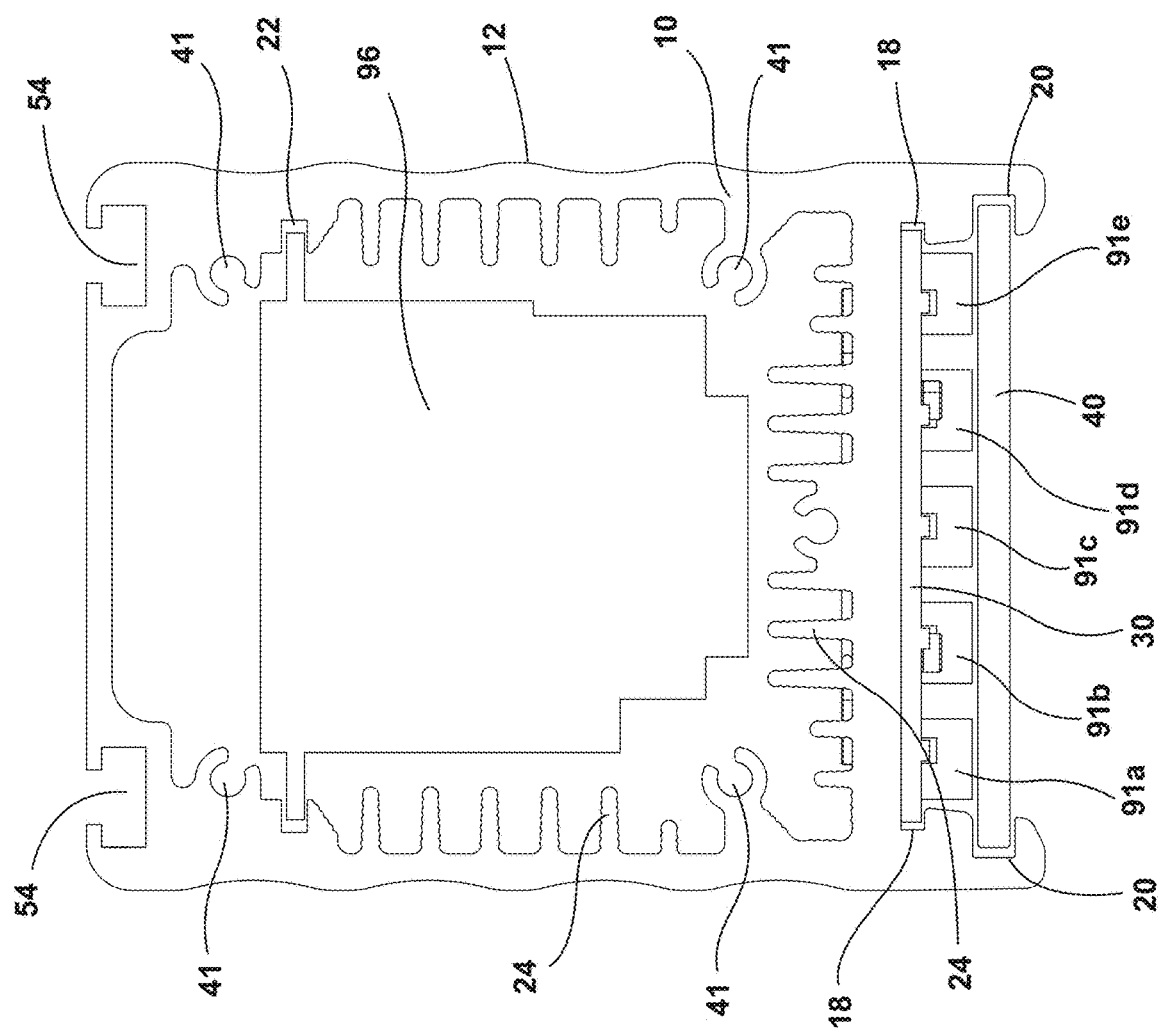
FIG. 7 is a rear view of the LED growth light shown in FIG. 1 with the end cap removed.
Figure 12:
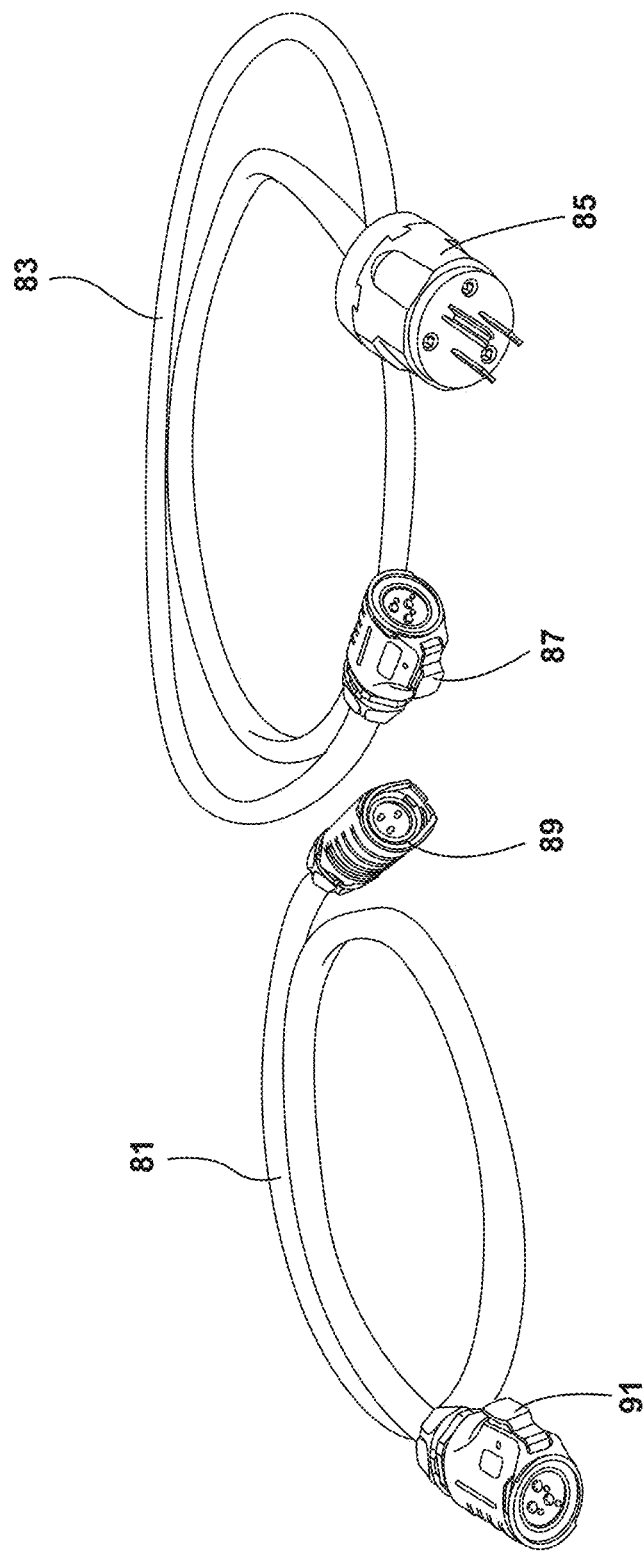
FIG. 12 is a perspective view of one embodiment of the cables used with the LED growth light, with a cable that connects multiple growth lights to each other, as shown on the left, and a cable with an outlet plug, as shown on the right.
Figure 13:
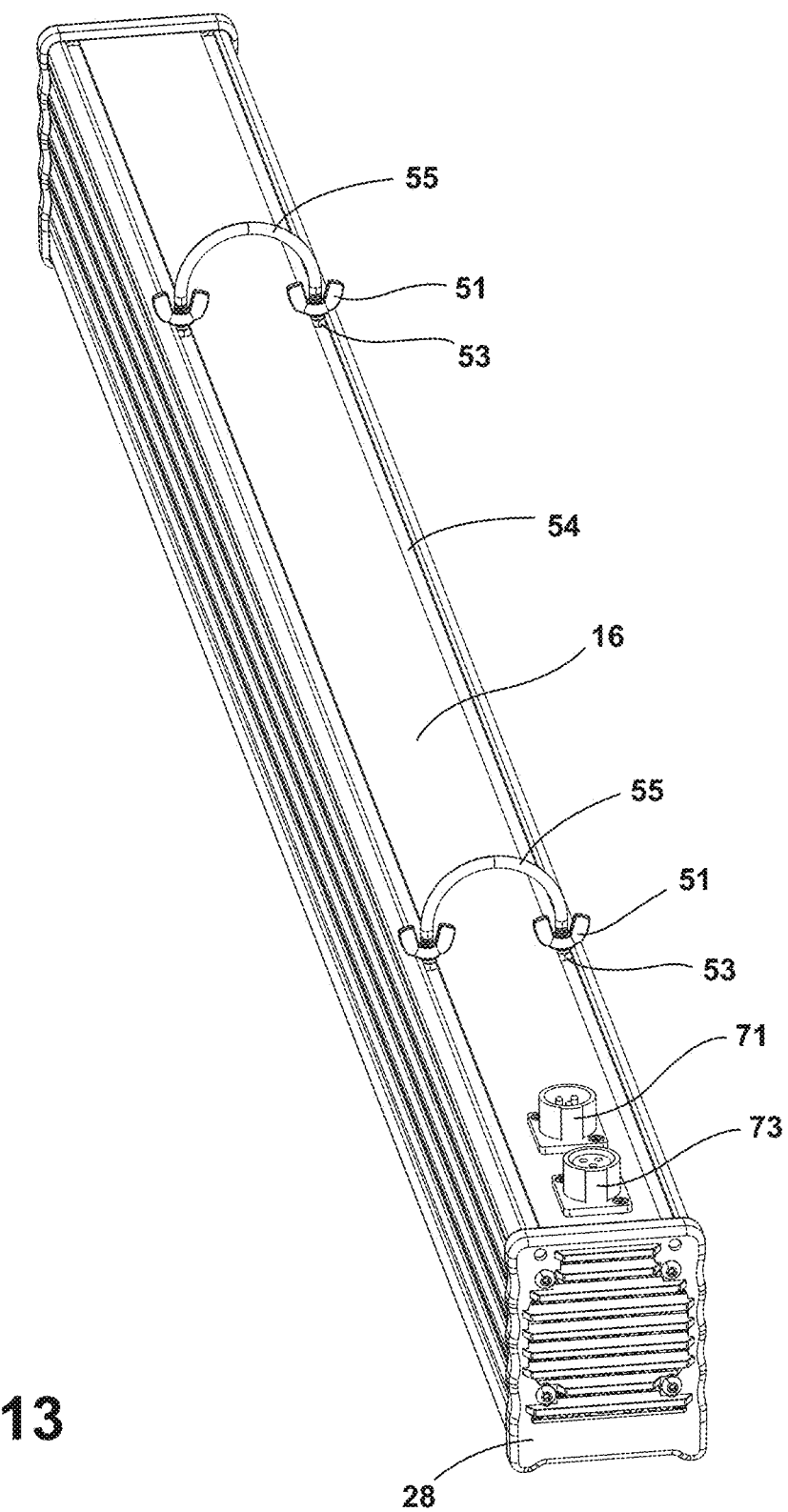
FIG. 13 is a top perspective view of the LED growth light of FIG. 1.

A power supply 96 is received in the internal slots 22 on the housing 4. The power supply 96 powers the printed circuit board 30 and is connected to terminals 71 and 73. In the illustrated embodiment, terminal 71 includes a male terminal. Terminal 73 includes a female terminal. A power supply cord 81 (FIG. 12) includes a male end 89 and a female end 91. This power supply cord 81 can be used to supply power from one LED growth light 2 to another LED growth light 2 that is connected to terminal 71. Power cord 81, with female end 87 connects to terminal 71 to provide power to the power supply 96. An outlet power cord 83 can include an outlet plug 85 that connects to a wall outlet and connects to terminal 73. Thus, the terminals 71, 73 allow one individual LED growth light 2 to be connected to a power source, such as a standard power outlet. In addition, the terminals 71, 73 permit the connection of multiple LED growth lights 2 to tether/bridge in a manner resulting in a group of LED growth lights being powered by a single outlet. The power connections can be configured such that the power connections that are being made from one LED growth light 2 to another LED growth light 2 are appropriately positioned. Thus, the terminals 71, 73 on the LED growth light 2 can have different shapes and/or different connections to ensure that the appropriate power arrangement is maintained when the LED growth lights 2 are put into a building. The terminals 71, 73 can also have caps 75 and seals 79 to help seal the terminals 71, 73, to housing 4. Fasteners 67 can be inserted through the seals 79, caps 75, terminals 71, 73, and into fastener apertures 83 in the upper surface 16 of housing 4 to help secure and position the terminals 71, 73 in terminal openings 85, 87 in the housing 4, as illustrated in FIG. 5.

A lens 40 is received in the lens slots 20. In the illustrated embodiment, the lens 40 is a generally flat lens that is approximately 9 mm thick. However, lenses 40 that include curved or angled surfaces can be utilized. Lenses 40 can also be multiple pieces and/or include concave or convex surfaces to help dissipate or focus the light generated in the LED chips 32. In addition, the lens 40 can be made of a glass material, a hardened glass material, a clear polymeric material, or other material.

The angle of the louvres 46 on the end caps 26, 28 can be from 15° to 75°. The end caps 26, 28 and the orientation of the openings in the end caps 26, 28 are designed to prevent the intake of water, debris, or other material into the interior of the housing to prevent damage to the power supply 96 and other components of the LED growth light 2. The end caps 26, 28 also provide airflow for cooling the power source 96 and other components of the LED growth light 2. A filter 202 (FIGS. 24-26) can also be used near the first end 8 to filter the air that is drawn into or pushed out of the first end 8. As illustrated in FIGS. 24-26, an end cap cover 200, with slots 201 to receive filter 202, can be used to connect a modified end cap 204. The end cap cover 200 includes slot 206 for coupling the end cap cover 200 to the modified end cap 204. The modified end cap 204 has a pair of vanes 205. As illustrated in FIG. 26, the filter 202 filters air A that is drawn into the housing 4 by fan 50. A filter 202 can also be used at the second end 10.

The first end 8 can also be covered by a duct connecting end cap 80 (FIGS. 16, 18, 19, and 30). The end cap 80 includes fastener openings 44 to connect the end cap 80 to the first end 8 of housing 4. The end cap 80 has a generally cylindrical portion 82 that can connect to a generally cylindrical duct 84. This permits air to be drawn into or pushed out of the first end 8 by fan 50 from the cylindrical duct 84. The cylindrical duct 84 can be connected to another end cap 80 on another LED growth light 2. The cylindrical duct 84 could also draw air from a different area remote from the LED growth light 2. The end cap 80 can also be used on the second end 10 of the housing 4. Thus, air exiting the LED growth light 2 can be directed toward the plants and/or used to provide supplemental heat to the building. The cylindrical duct 84 can be flexible and can turn in any direction and/or connect to different shaped duct work.

A hood 300 having an angled surface 302 can be connected to either or both ends 8, 10 of the housing 4. For example, the hood 300 can be connected to end plate 310 on the first end 8 of the housing 4, as illustrated in FIGS. 27-29. The angled surface 302 will direct water W away from the first end 8. The air A can be drawn upward from the lower side of hood 300, as illustrated in FIG. 29. The hood 300 can include a slotted portion 304 to help connect the hood 300 to the end plate 310. Thus, hood 300 can prevent debris, water, and other items from entering the housing 4. A filter 202 can be used with the hood 300. Thus, combinations of filters 202, hoods 300, louvres 46, 48, and other features can protect the internal components of the LED growth light 2 from water, moisture, and debris. In addition, a wire grommet 56 can be used to hold wires in place and to help seal between the printed circuit board 30 and the end caps 26, 28.

Figure 20:
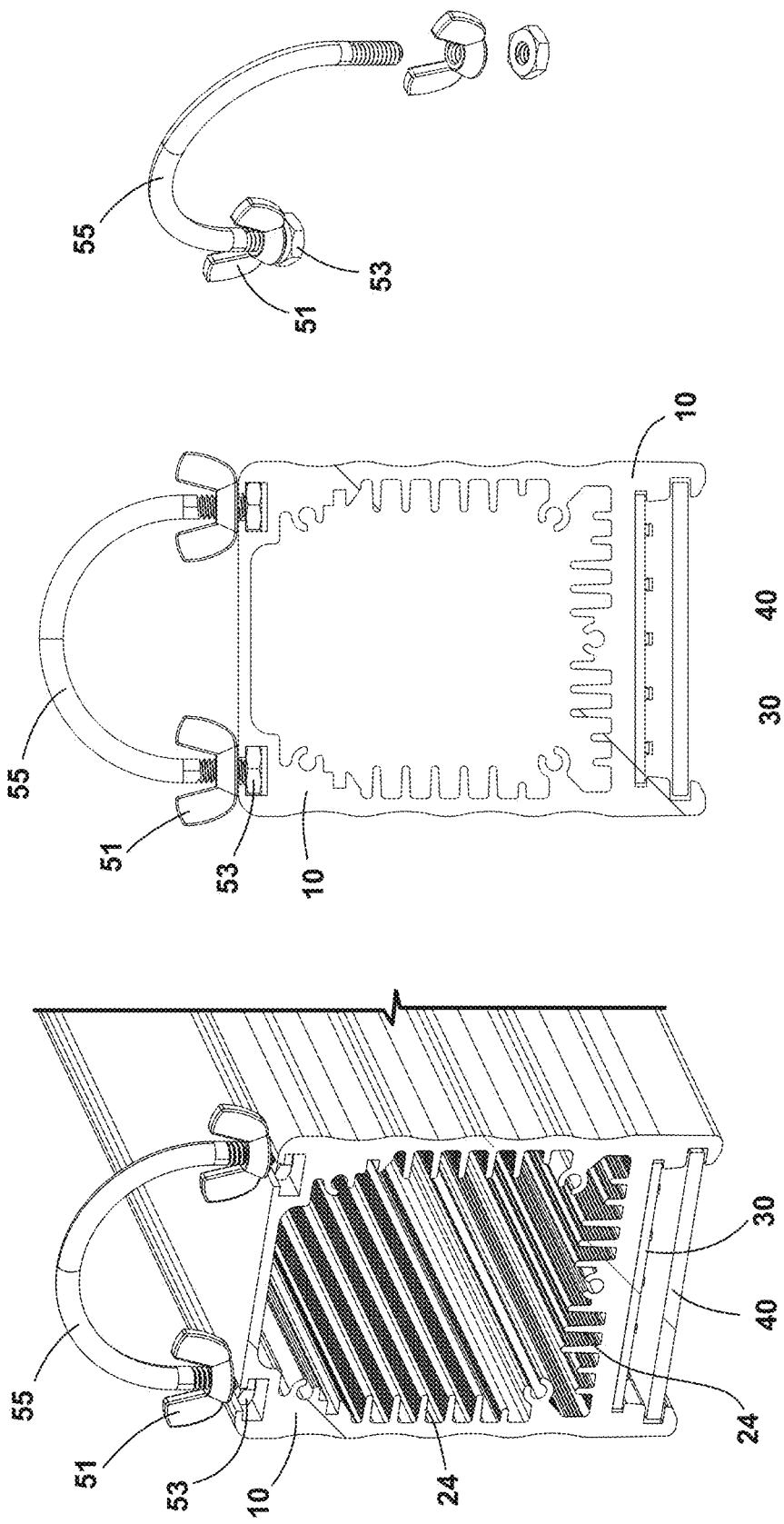
FIG. 20 are views illustrating one embodiment of a hangar bracket attached to the accessory rail of the LED growth light.

The accessory rails 54 can be used to hang the LED growth light 2, including through the use of a hanger 55. Hanger 55 can have a curved shape and include threaded ends that fit into each of the accessory rails 54. Nuts 53 (FIG. 20) can be situated in the accessory rails 54, and wingnuts 51 can be loosened and tightened for repositioning the hangers 55. Thus, the number and spacing of the hangers 55 on the housing 4 can easily be changed. The generally inverted T shape of accessory rails 54 permits a secure fit between the nuts 53, the wingnuts 51, and the upper surface 16 of the housing 4.

The fan 50 in the illustrated embodiment is shown as being attached internally within the housing 4 near the first end 8. The fan 50 is powered by the power supply 96 and is secured to the housing 4 by the fasteners 44 that are received in fastener apertures 57 in the fan 50, and coupled to fastener apertures 41 within the housing 4.

The power supply 96 includes a number of resistors that permit the uniform powering of the LED chips 32 within each of the five columns 91a-91e. The spacing of the resistors prevents the power to the LED chips 32 from being significantly downgraded within portions of the five columns 91a-91e. The resistors can also serve as power dams between light segments on the printed circuit board 30. Capacitors can be used that have temperature ratings of up to or above 125° C.

In addition to the transformer, circuit, resistors, and other features in the power supply 96, the controllers include an IOT/mesh control chip which can be controlled via Bluetooth, WiFi, computer, cell phone, or other smart device. The power supply 96 can include an antenna 90. This control permits the control of the timing and power supply to the five columns 91a-91e of LEDs and also permits the individual columns to be turned up or turned down. Alternative arrangements can include the power supply 96 being positioned entirely or partially outside the interior of the housing. Moreover, the power supply 96 can provide power to accessories in the accessory rails 54.

Software can permit the control of multiple LED growth lights 2, multiple rooms, multiple growth facilities, and specified groupings of LED growth lights 2.

Figure 31:
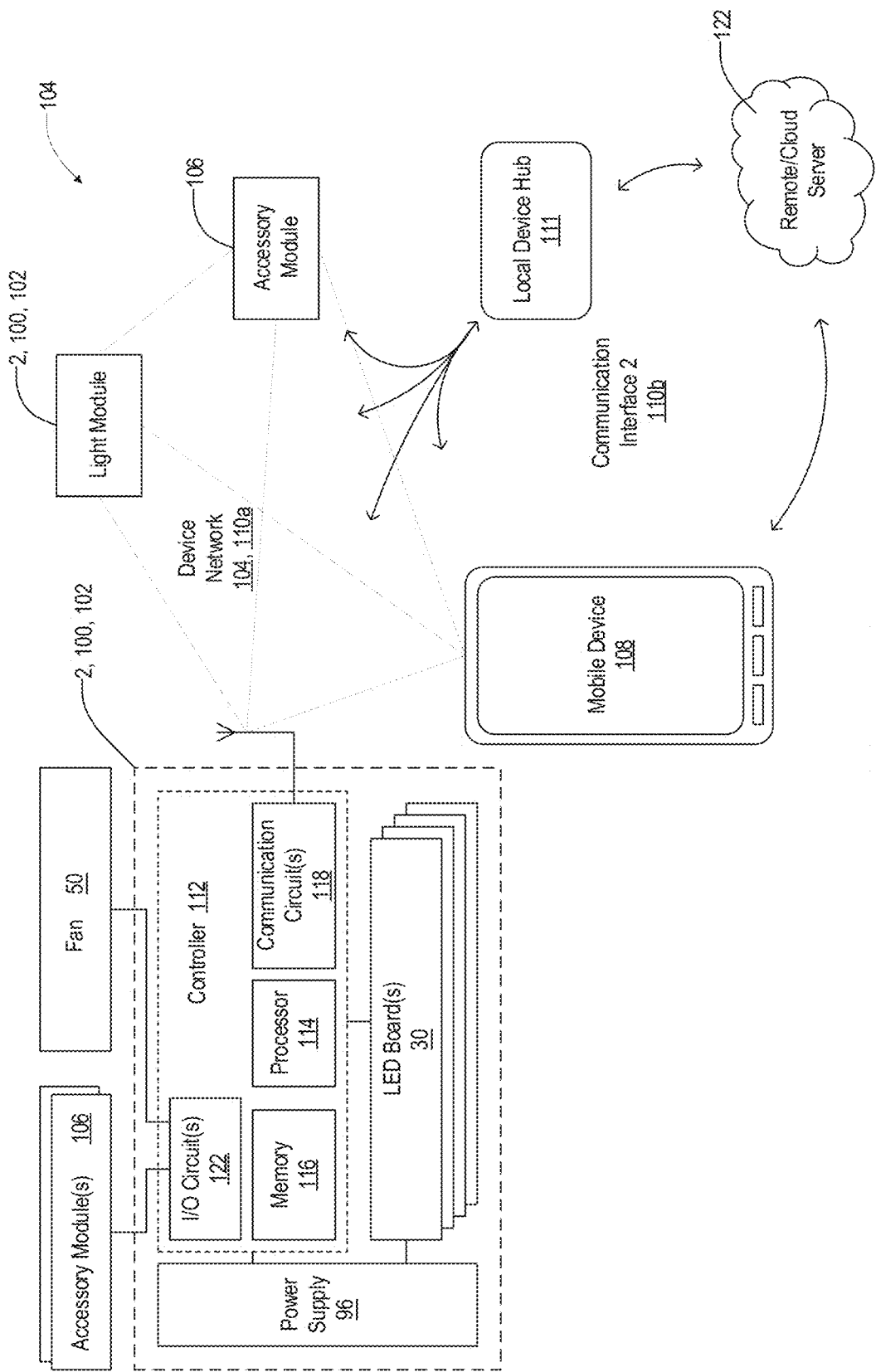
FIG. 31 is a block diagram of the LED growth light and the lighting module incorporated as a node of a device network.
Figures 32, 33:
FIG. 32 is an illustration of an exemplary algorithm.
FIG. 33 is an illustration of Example A of the algorithm.
Figure 34:
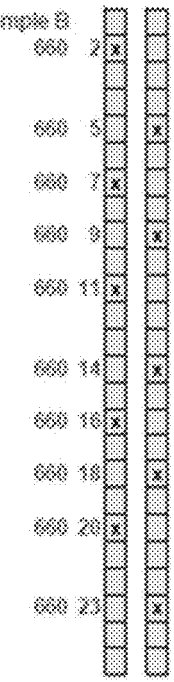
FIG. 34 is an illustration of Example B of the algorithm.
Figure 35:
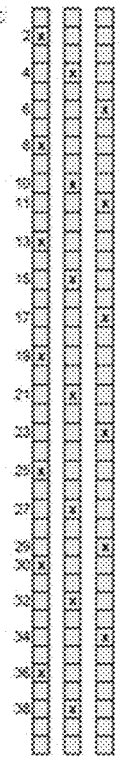
FIG. 35 is an illustration of Example C of the algorithm.

Referring to FIG. 31, a block diagram of the LED growth light 2, or more generally a lighting module 100, is shown incorporated as a node of a device network 104. As shown the device network 104 may include a variety of electronic devices, which may be configured to communicate over various wired or wireless communication protocols. In the example shown, multiple lighting modules 100 are in communication with an accessory module 106 and a mobile device 108 via a first communication interface 110*a*. The device network 104 may be implemented as a mesh or internet of things (IoT) network, wherein each of the connected devices 100, 106, 108 is operable to communicate directly with one another via the first communication interface 110*a*. Additionally, each of the connected devices 100, 106, 108 may be in communication via a second communication interface 110*b* which may utilize a router or local device hub 111. The local device hub 111 may correspond to a smart device hub, a wireless router, and/or a wired communication network. Accordingly, the device network 104 permits coordinated control and programming of each of the connected devices 100, 106, 108 via a hierarchical control structure and/or via a distributed control structure.

The lighting module(s) 100 provide for programmable operation via a controller 112 configured to control various components and/or integrated circuits to provide for the control of the operation of the printed circuit board 30 with LED chips 32. The controller 112 may include various types of control circuitry, digital and/or analog, and may include a processor 114, microcontroller, application-specific integrated circuit (ASIC), or other circuitry configured to perform various input/output, control, analysis, and other functions as described herein. The controller 112 further includes a memory 116 configured to store one or more routines and/or configuration attributes of the assembled components including, but not limited to, storing attributes of lighting configurations (i.e., values, network IDs, and routines) as discussed herein. The memory 116 may be implemented by a variety of volatile and non-volatile memory formats. One or more communication circuits 118 of the lighting module(s) 100 may be incorporated with the controller 112 or in communication with the controller 112 to permit communication via the first and second communication interfaces 110 as discussed herein.

The controller 112 of the lighting module 100 receives power from a power supply 96, which may further be configured to supply power to the accessory module(s) 106 via one or more input-output (I/O) circuits 122. The power supply 96 may include one or more transformers, rectifier, capacitors, and various electrical components to condition the power for the controller 112, the printed circuit board 30, and the accessory modules 106 connected via the I/O circuits 122. Accordingly, the accessory module(s) 106 may be implemented as independent devices in communication via the device network 104 and/or as connected accessories in connection with the I/O circuit(s) 122 of the controller 112. Additionally, as previously discussed, the controller 112 is configured to control the fan 50 to ensure that the operating temperature of the printed circuit board 30 remains within a desired operating range.

The accessory module(s) 106 may include a variety of devices, that may be controlled by instructions communicated from the controller 112 via the communication circuit 118 and/or the I/O circuits 122. The controller 112 may be configured to communicate control instructions to the accessory module(s) 106 and additional lighting modules 100 to provide for coordinated control of the connected devices 100, 106, 108. The accessory module(s) 106 may include watering pumps or valves, cameras, sensors, motorized mirrors, misters, raising and lowering apparatuses or actuators, and a variety of other accessories. Accordingly, the disclosure provides for a scalable and flexible system that may be utilized to light and control the environmental conditions of individual plants or large scale nursery/growing operations.

Still referring to FIG. 31, the connected devices 100, 106, 108, etc. may be configured to communicate via each of the communication interfaces 110*a/b*. The first communication interface 110*a* provides for communication among each of the connected devices 100, 106, 108 via a local mesh network topology. In this configuration each of the connected devices 100, 106, 108 serves as a communication node in direct or indirect, non-hierarchical communication with each of the devices on the device network 104. Such communication among the connected devices 100, 106, 108 may be supported by various communication protocols, including but not limited to Bluetooth™, Bluetooth™ low energy (BLE), Thread, Z-Wave, ZigBee, etc. In this configuration, the connected devices 100, 106, 108 may operate via a decentralized control structure.

The second communication interface 110*b* may correspond to a centralized or hierarchical interface wherein one or more of the connected devices communicate via the local device hub 111, a router, or communication routing controller. The second communication interface 110*b* may be implemented via a variety of communication protocols in various combinations, including but not limited to, global system for mobile communication (GSM), general packet radio services (GPRS), Code division multiple access (CDMA), enhanced data GSM environment (EDGE), fourth-generation (4G) wireless, fifth-generation (5G) wireless, Bluetooth™, Bluetooth™ low energy (BLE), Wi-Fi, world interoperability for microwave access (WiMAX), local area network (LAN), Ethernet, etc. By flexibly implementing the first and second communication interfaces 100, the lighting module(s) 100 may be in communication with one or more of the connected devices 100, 106, 108, and a remote server 122 directly and/or via the local device hub 111.

The mobile device 108 may correspond to a mobile communication device (e.g., cell phone, tablet, smartphone, etc.). In some embodiments, electronic communication devices may include other mobile electronic devices such as laptops, personal computers, and/or other devices. The mobile device 108 may be configured to run various software applications configured to control the settings of the lighting module(s) 100, the accessory module(s) 106, and communicate control parameters for connected devices 100, 106, 108 as identified via the onboard software applications or based on instructions received from the remote server 122. Software operating on the mobile device 108 can enable the control of multiple lighting modules 100, multiple rooms of connected devices as discussed herein, multiple growth facilities, and specified groupings of lighting modules 100. Accordingly, the mobile device 108 may be configured to facilitate a variety of coordinated control routines including scheduled operations and activities for the connected devices 100, 106, 108, which may reside in a common location and/or be distributed over a variety of locations.

An exemplary embodiment of the mobile device 108 may be configured to communicate with the device network 104 via the first communication interface 110*a* and/or the second communication interface 110*b*. The mobile device 108 may communicate with the connected devices 100, 106, 108 via the first communication interface 110*a* and/or via the second communication interface 110*b*. The local device hub 111 may provide for routing and management of the communication among the devices connected on the device network 104 and may provide for communication to the remote server 122. Such communication may be processed via the second communication interface 110b and may include networking equipment such as routers, servers, cellular towers, switches, and/or other hardware for enabling network communication. The network may be the internet, an intranet, and/or a cloud computing system architecture. The mobile device 108 is not limited to remote mobile devices and can include any internet/Bluetooth™ enabled devices, including those that are directly wired.

A device can be attached directly to or wired adjacent to the LED growth light 2 to allow for the control of the LED growth light 2. This can be used in addition to remote device control and/or in lieu of remote device control.

As described above, the power supply and the LED alignment permits the user to selectively increase one or more columns 91a-91e of the LED chips 32 to provide the plants with an increased amount of whatever portion of the light spectrum the user wants to use with the plants. This will permit the user to alter the length of the lighting, the intensity of the lighting, variations in peaks of the lighting, and the distribution of the wave lengths of lighting to be tailored with respect to the different types of plants or the stage of the plant growth. Data from sensors, images from cameras, or other apparatus feedback can be used to trigger or turn off certain settings.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention is claimed as follows:

1. A growth light comprising:
a housing;
at least one printed circuit board slot for receiving a printed circuit board;
a plurality of LED chips arranged on said printed circuit board including at least one column providing light in a range of 551 to 2000 nanometers, at least one column providing light in a range of 100 to 550 nanometers including multiple spaced apart cyan LED chips that provide light in a 490 to 510 nanometer range, and at least one column of white LED chips; and
a power supply received in said housing that powers said printed circuit board such that each of the individual columns of LED chips can be individually powered.

2. The growth light of claim 1, wherein said housing is a unitary piece of metal.

3. The growth light of claim 2, wherein said housing is extruded aluminum.

4. The growth light of claim 1, wherein said columns of LED chips are linear.

5. The growth light of claim 1, further including a fan that is positioned on the inside of said housing.

6. The growth light of claim 5, wherein said housing includes at least one internal surface for engaging at least one surface of said fan.

7. The growth light of claim 1, wherein said housing includes at least one accessory rail located on an exterior surface of said housing.

8. The growth light of claim 7, wherein said at least one accessory rail has an inverted T shape.

9. The growth light of claim 8, wherein said housing has a pair of accessory rails on an upper surface of said housing that are located on lateral edges of said upper surface near side surfaces.

10. The growth light of claim 1, further including a first end cap with angled louvres.

11. The growth light of claim 1, further including a wire grommet located adjacent to the printed circuit board.

12. The growth light of claim 1, further including a second end cap with angled louvres.

13. The growth light of claim 10, wherein said first end cap includes a filter.

14. The growth light of claim 1, further including a lens.

15. The growth light of claim 1, wherein said housing includes a plurality of internal fans.

16. An LED growth light comprising:
a housing having an exterior surface with a first end, a second end, side surfaces, a lower surface, and an upper surface;
a printed circuit board with lines of LED chips, at least one line providing light in a range of 551 to 2000 nanometers, at least one line providing light in a range of 100 to 550 nanometers including multiple spaced apart cyan LED chips that provide light in a 490 to 510 nanometer range, and at least one line that includes white light LED chips; and
a power source receiving power from outside of the housing and supplying power to said printed circuit board such that each of the individual lines of LED chips can be individually powered.

17. The LED growth light of claim 16, further including a lens that is coupled to the housing.

18. The LED growth light of claim 16, wherein said lines of LED chips are straight.

19. The LED growth light of claim 16, wherein said lines of LED chips are parallel.

20. An LED growth light comprising:
a housing having an exterior surface with a first end, a second end, at least one side surface, a lower surface, and an upper surface;
a printed circuit board with individually powered columns of LED chips, at least one column providing light in a range of 551 to 2000 nanometers, at least one column providing light in a range of 100 to 550 nanometers including multiple spaced apart cyan LED chips that provide light in a 490 to 510 nanometer range, and at least one column that includes a plurality of white LED chips;
a power source coupled to an interior surface of said housing that provides power to the printed circuit board; and
a communication interface that communicates with a device network that permits the control of the printed circuit board by an electronic device such that each of the individually powered columns of LED chips can be individually turned up or down.

* * * * *